(12) United States Patent
Wu et al.

(10) Patent No.: US 12,282,649 B2
(45) Date of Patent: Apr. 22, 2025

(54) METHOD FOR MANAGING APPLICATION ICON, TERMINAL DEVICE, AND STORAGE MEDIUM

(71) Applicant: Honor Device Co., Ltd., Shenzhen (CN)

(72) Inventors: Yu Wu, Shenzhen (CN); Ting Zhang, Shenzhen (CN); Yi Han, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 214 days.

(21) Appl. No.: 17/924,005

(22) PCT Filed: Aug. 26, 2021

(86) PCT No.: PCT/CN2021/114708
§ 371 (c)(1),
(2) Date: Nov. 8, 2022

(87) PCT Pub. No.: WO2022/134637
PCT Pub. Date: Jun. 30, 2022

(65) Prior Publication Data
US 2023/0176717 A1   Jun. 8, 2023

(30) Foreign Application Priority Data
Dec. 25, 2020   (CN) .......................... 202011564302.3

(51) Int. Cl.
*G06F 3/04845*   (2022.01)
*G06F 3/04817*   (2022.01)

(52) U.S. Cl.
CPC ...... *G06F 3/04845* (2013.01); *G06F 3/04817* (2013.01)

(58) Field of Classification Search
CPC ............. G06F 3/04845; G06F 3/04817; G06F 3/04842; G06F 2203/04806;
(Continued)

(56) References Cited

U.S. PATENT DOCUMENTS 9,940,010 B2    4/2018  Xu
D832,881 S  *  11/2018  Crosley ........................ D14/486
(Continued)

FOREIGN PATENT DOCUMENTS

CN    103150170 A    6/2013
CN    103488379 A    1/2014
(Continued)

*Primary Examiner* — Jitesh Patel
(74) *Attorney, Agent, or Firm* — Conley Rose, P.C.

(57) ABSTRACT

A method for managing an application icon, a terminal device, and a storage medium. In a scenario of installing an application on the terminal device, whether a target closed circle exists in closed circles in a direction from inside to outside in an icon grid is determined, where the icon grid is formed by arranging all current application icons of the terminal device in a grid manner, the closed circles are rectangular circles centered on a center of the icon grid, and a free position for an application icon exists on the target closed circle. If the target closed circle exists, a target application icon is added at the free position on the target closed circle to ensure that the application icons remain in an aggregated and compact visual form.

20 Claims, 17 Drawing Sheets

(58) Field of Classification Search
CPC ........... G06F 2203/04808; G06F 1/163; G06F 1/169; G06F 3/0362; G06F 3/0482; G06F 3/0485; G06F 3/04883; H04M 1/724095; H04M 2250/22; H04M 1/72469

See application file for complete search history.

(56) References Cited

U.S. PATENT DOCUMENTS

| | | | |
|---|---|---|---|
| 2008/0256492 A1 | 10/2008 | Yamamoto et al. | |
| 2009/0262190 A1* | 10/2009 | Dotchevski | G06F 3/0304 348/143 |
| 2015/0026617 A1* | 1/2015 | Liang | G06F 3/0482 715/765 |
| 2015/0089407 A1* | 3/2015 | Suzuki | G06F 3/04842 715/834 |
| 2015/0160804 A1* | 6/2015 | Fujimoto | H04N 21/4858 715/811 |
| 2016/0085413 A1 | 3/2016 | Luo et al. | |
| 2016/0162157 A1* | 6/2016 | Liang | G06F 3/0482 715/765 |
| 2016/0320756 A1* | 11/2016 | Lee | G06F 3/04817 |
| 2017/0277380 A1* | 9/2017 | Shan | G06F 3/0488 |
| 2017/0329490 A1* | 11/2017 | Esinovskaya | G06F 3/04817 |
| 2018/0217732 A1* | 8/2018 | Wang | G06F 3/0484 |
| 2020/0348765 A1* | 11/2020 | Gurovich | G06F 1/1698 |
| 2020/0387289 A1 | 12/2020 | Dunn et al. | |
| 2022/0197482 A1 | 6/2022 | Zhu et al. | |
| 2023/0176717 A1 | 6/2023 | Wu et al. | |

FOREIGN PATENT DOCUMENTS

| | | |
|---|---|---|
| CN | 104391637 A | 3/2015 |
| CN | 104461655 A | 3/2015 |
| CN | 105808061 A | 7/2016 |
| CN | 105955583 A | 9/2016 |
| CN | 106126018 A | 11/2016 |
| CN | 109933252 A | 6/2019 |
| CN | 110032307 A | 7/2019 |
| CN | 118244941 A | 6/2024 |
| JP | 2002245323 A | 8/2002 |
| JP | 2013073513 A | 4/2013 |

* cited by examiner (a)

(b)

(c)

(a)

(b)

(c)

(a)

(b)

(c)

METHOD FOR MANAGING APPLICATION ICON, TERMINAL DEVICE, AND STORAGE MEDIUM

CROSS-REFERENCE TO RELATED APPLICATIONS

This application is a U.S. National Stage of International Application No. PCT/CN2021/114708 filed on Aug. 26, 2021, which claims priority to Chinese Patent Application No. 202011564302.3 filed with the China National Intellectual Property Administration on Dec. 25, 2020, both of which are incorporated herein by reference in their entireties.

TECHNICAL FIELD

This application relates to the fields of electronic technologies and terminals, and in particular, to a method for managing an application icon, a terminal device, and a storage medium.

BACKGROUND

Icons corresponding to applications installed on a device are arranged in an application desktop of a smartwatch. A user can look for an icon of a to-be-run application, install a new application, or uninstall an application in the application desktop.

At present, the smartwatch can display a fixed quantity of application icons on one screen in the application desktop in a vertical arrangement. In a scenario in which application icons need to be adjusted, for example, when a new application is installed or an application is uninstalled, positional relationships between the application icons change. Such a single-axis arrangement makes it difficult for the user to memorize and look for a position of an icon, resulting in a poor display effect of icons and poor user experience.

SUMMARY

Embodiments of this application provide a method for managing an application icon, a terminal device, and a storage medium, to enhance a display effect of application icons and improve user experience.

According to a first aspect, a method for managing an application icon is provided. In a scenario in which a target application is installed on a terminal device, it is determined whether a target closed circle exists in closed circles in a direction from inside to outside in an icon grid (a second grid in the embodiments of this application). The icon grid is formed by arranging all current application icons of the terminal device in a grid manner, the closed circles are rectangular circles centered on a center of the icon grid, and a free position for an application icon exists on the target closed circle. If the target closed circle exists, a target application icon corresponding to the target application is added at the free position on the target closed circle.

In the method for managing an application icon provided according to the first aspect, when adding an icon of a newly installed application, the terminal device first determines whether an existing closed circle is a complete rectangular layout and whether a free position for an application icon exists. If the existing closed circle is not a complete rectangular layout, the icon of the newly installed application is added at the free position on the incomplete closed circle, to ensure that the application icons remain in an aggregated and compact visual form, which is convenient for a lookup operation performed by a user, enhances the display effect of application icons, and improves the user experience.

Optionally, in an implementation, the adding a target application icon corresponding to the target application at the free position on the target closed circle may include: determining a first free position on the target closed circle, where the first free position is the first free position starting from a preset starting position of the target closed circle in a preset direction; and adding the target application icon at the first free position.

In this implementation, when adding an icon of the newly installed application on the incomplete closed circle, the terminal device can sequentially add a new application icon at a free position starting from a preset position in a preset direction, to ensure that the application icons remain in an aggregated and compact visual form.

Optionally, in an implementation, the adding a target application icon corresponding to the target application at the free position on the target closed circle may include: obtaining a distance between the free position on the target closed circle and the center of the icon grid; determining a second free position on the target closed circle according to the distance, where a distance between the second free position and the center of the icon grid is a minimum of distances corresponding to all free positions on the target closed circle; and adding the target application icon at the second free position.

In this implementation, when adding an icon of the newly installed application on the incomplete closed circle, the terminal device can sequentially add a new application icon at a free position in ascending order according to a distance between the free position and the center of the icon grid, to ensure that the application icons remain in an aggregated and compact visual form.

Optionally, in an implementation, if there are a plurality of target closed circles, a new application icon may be sequentially added on each target closed circle in a direction from inside to outside in the icon grid, to ensure that the application icons remain in an aggregated and compact visual form.

Optionally, in an implementation, the method may further include: adding a new closed circle in the icon grid if the target closed circle does not exist, and adding the target application icon at a preset starting position of the new closed circle.

In this implementation, when adding an icon of the newly installed application, if all existing closed circles are complete rectangular layouts, the terminal device adds a new closed circle, and adds the new application icon starting from a specific position of the new closed circle, to ensure that the application icons remain in an aggregated and compact visual form, which is convenient for a lookup operation performed by a user, enhances the display effect of application icons, and improves the user experience.

According to a second aspect, a method for managing an application icon is provided. In a scenario in which a target application is uninstalled from a terminal device, a target application icon corresponding to the target application is deleted from an icon grid (a second grid in the embodiments of this application), where the icon grid is formed by arranging all current application icons of the terminal device in a grid manner. It is determined whether first to-be-moved application icons (all application icons between the first application icon and the second application icon in the embodiments shown in FIG. 15 to FIG. 18 of this application) exist in a first direction (the first direction in the embodiments shown in FIG. 15 to FIG. 18 of this application) in a preset region in which the target application icon is located. The icon grid is divided into four preset regions (referring to FIG. 16 of this application), the preset regions are bounded by a row and a column in which a center of the icon grid is located, and the first direction is a horizontal direction or a vertical direction away from the center of the icon grid with the target application icon as a starting point. The first to-be-moved application icons are moved according to an opposite direction of the first direction if the first to-be-moved application icons exist in the first direction.

In the method for managing an application icon is provided according to the second aspect, in a scenario in which a target application is uninstalled from a terminal device, positions of other application icons in a region in which the target application icon is located are adjusted. Specifically, positions of application icons are slightly adjusted in the first direction while being visible to the user, to ensure that the application icons after the position adjustment remain in an aggregated and compact visual form, which is convenient for a lookup operation performed by a user, enhances the display effect of application icons, and improves the user experience.

Optionally, in an implementation, the method may further include: determining whether second to-be-moved application icons (all application icons between the third application icon and the fourth application icon in the embodiments shown in FIG. 15 to FIG. 18 of this application) exist in a second direction (the second direction in the embodiments shown in FIG. 15 to FIG. 18 of this application) in the preset region in which the target application icon is located. The second direction is a horizontal direction or a vertical direction away from the center of the icon grid with a target position as a starting point, the second direction is perpendicular to the first direction, and the target position (the first position in the embodiments shown in FIG. 15 to FIG. 18 of this application) is a position at which the last first to-be-moved application icon in the first direction is located before the last first to-be-moved application icon is moved in the opposite direction of the first direction. The second to-be-moved application icons are moved according to an opposite direction of the second direction if the second to-be-moved application icons exist in the second direction.

In this implementation, after the positions of the application icons are slightly adjusted in the first direction, the positions of the application icons continue to be slightly adjusted in the second direction while being visible to the user, to ensure that the application icons after the position adjustment remain in an aggregated and compact visual form.

Optionally, in an implementation, the method may further include: determining, if no first to-be-moved application icon exists in the first direction, whether third to-be-moved application icons (all application icons between the fifth application icon and the sixth application icon in the embodiments shown in FIG. 15 to FIG. 18 of this application) exist in a third direction (the second direction in the embodiments shown in FIG. 15 to FIG. 18 of this application) in the preset region in which the target application icon is located. The third direction is a horizontal direction or a vertical direction away from the center of the icon grid with the target application icon as a starting point, and the third direction is perpendicular to the first direction. The third to-be-moved application icons are moved according to an opposite direction of the third direction if the third to-be-moved application icons exist in the third direction.

In this implementation, if the positions of the application icons do not need to be adjusted in the first direction, the positions of the application icons continue to be slightly adjusted in the third direction while being visible to the user, to ensure that the application icons after the position adjustment remain in an aggregated and compact visual form.

In the first aspect and the second aspect, optionally, in an implementation, the method for managing an application icon may further include: displaying a first desktop (a desktop under a local view in the embodiments of this application), where the first desktop includes application icons in a preset quantity of rows and a preset quantity of columns in the icon grid; receiving an application icon position adjustment operation performed by a user (referring to FIG. 23 and FIG. 24 of this application), where the application icon position adjustment operation is used for moving a first application icon (the to-be-moved application icon in the embodiments shown in FIG. 23 and FIG. 24 of this application) in the first desktop to a position (the target movement position in the embodiments shown in FIG. 23 and FIG. 24 of this application) of a second application icon in the icon grid; and moving the first application icon to the position of the second application icon in response to the application icon position adjustment operation.

In this implementation, the user can move a position of a specific application icon on the desktop under a local view through the application icon position adjustment operation. Because the application icons in the terminal device are arranged and displayed in a grid manner, which is convenient for the user to memorize and look up the application icons, enhances the display effect of application icons, and improves the user experience.

Optionally, in an implementation, the moving the first application icon to the position of the second application icon may include: swapping the first application icon and the second application icon.

In this implementation, the first application icon and the second application icon are directly swapped, which has a simple implementation, avoids adjusting positions of other application icons, is convenient for the user to memorize and look up the application icons, enhances the display effect of application icons, and improves the user experience.

Optionally, in an implementation, the moving the first application icon to the position of the second application icon may include: circularly moving, if the first application icon and the second application icon are located on a same straight line, application icons on the straight line and between the first application icon and the second application icon in sequence; and determining, if the first application icon and the second application icon are not located on a same straight line, a right triangle with the first application icon and the second application icon as hypotenuse vertices, and circularly moving application icons on the right triangle.

In this implementation, the positions of the application icons can be slightly adjusted, which avoids adjusting positions of other application icons greatly, is convenient for the user to memorize and look up the application icons, enhances the display effect of application icons, and improves the user experience.

Optionally, in an implementation, the method for managing an application icon may further include: displaying a first desktop, where the first desktop includes application icons in a preset quantity of rows and a preset quantity of columns in the icon grid; receiving a first desktop switching operation performed by the user (referring to FIG. 6 and FIG. 7 of this application); and switching display of the first desktop to display of the second desktop in response to the first desktop switching operation, where (a desktop under a global view in the embodiments of this application). The second desktop includes all the application icons in the icon grid, and a center of the second desktop is the center of the icon grid.

In this implementation, the user can switch display of a desktop under a local view to display of a desktop under a global view through a first desktop switching operation. Because the application icons in the terminal device are arranged and displayed in a grid manner, all the application icons are displayed in the desktop under the global view, which is convenient for the user to memorize and look up the application icons, enhances the display effect of application icons, and improves the user experience.

Optionally, in an implementation, the method for managing an application icon may further include: receiving a second desktop switching operation performed by the user; and switching display of the second desktop to display of a third desktop (a desktop under a local view in the embodiments of this application) in response to the second desktop switching operation. The third desktop includes the application icons in the preset quantity of rows and the preset quantity of columns in the icon grid, and a center of the third desktop is the center of the icon grid.

In this implementation, the user can switch display of a desktop under a global view to display of a desktop under a local view through a second desktop switching operation. Because the application icons in the terminal device are arranged and displayed in a grid manner, which is convenient for the user to memorize and look up the application icons, enhances the display effect of application icons, and improves the user experience.

Optionally, in an implementation, the first desktop switching operation and the second desktop switching operation are a crown rotating operation or a two-finger pinching operation.

Optionally, in an implementation, the method for managing an application icon may further include: displaying a first desktop, where the first desktop includes application icons in a preset quantity of rows and a preset quantity of columns in the icon grid; receiving a swipe operation performed by the user (referring to FIG. 13 and FIG. 14 of this application), where the swipe operation is used for displaying application icons in different regions in the icon grid in the first desktop; obtaining a starting position and a swiping trajectory of the swipe operation in response to the swipe operation; and determining a first reference point corresponding to the starting position in the icon grid according to the starting position, controlling the icon grid to move as a whole with the first reference point as a center and according to the swiping trajectory, to display the application icons in the different regions in the icon grid in the first desktop.

In this implementation, the user can move and display application icons in different regions in the icon grid in the desktop under the local view through a swipe operation, and an effect of moving with the hand is presented, which is convenient for the user to look up the application icons.

Optionally, in an implementation, the method for managing an application icon may further include: obtaining an end position of the swipe operation in response to the swipe operation; determining a reference application icon in the icon grid according to a center of the first desktop and position information of the application icons in the icon grid after moving the first reference point to the end position, where the reference application icon is an application icon displayed at the center of the first desktop after the swipe operation ends; determining to-be-displayed application icons in the first desktop according to the reference application icon; and displaying the to-be-displayed application icons in the first desktop.

In this implementation, after the user ends the swipe operation, an application icon in a specific region determined by the user in the icon grid can be displayed in the desktop under the local view, which is convenient for operations subsequently performed by the user.

According to a third aspect, an apparatus is provided. The apparatus is included in a terminal device, and the apparatus has a function of implementing behavior of the terminal device in the foregoing aspects and the possible implementations of the foregoing aspects. The functions may be implemented by using hardware, or may be implemented by hardware executing corresponding software. The hardware or the software includes one or more modules or units corresponding to the foregoing functions, for example, a display module or unit and a processing module or unit.

According to a fourth aspect, a terminal device is provided, including: one or more processors, one or more memories, and a display screen. The one or more memories store one or more programs, and when executed by the one or more processors, the one or more programs cause the terminal device to perform the method according to any one of the foregoing aspects.

According to a fifth aspect, this application provides a computer storage medium, storing computer instructions, where the computer instructions, when run on a terminal device, cause the terminal device to perform the method according to any one of the foregoing aspects.

According to a sixth aspect, this application provides a computer program product, causing, when run on a terminal device, the terminal device to perform the method according to any one of the foregoing aspects.

DESCRIPTION OF EMBODIMENTS

The following describes the embodiments of this application with reference to the accompanying drawings. The embodiments of this application may be combined with each other, and the same or similar concepts or processes may not be described repeatedly in some embodiments.

The terms "first", "second", "third", "fourth", and the like (if existing) in the embodiments of this application are intended to distinguish between similar objects rather than describe a specific sequence or a precedence order.

The method for managing an application icon provided in the embodiments of this application is applicable to a terminal device with a touchscreen, and a shape of the touchscreen and an interface displayed by the touchscreen are not limited in the embodiments of this application, and for example, may be a circle or a rectangle. A name and a type of the terminal device are not limited in the embodiments of this application. At present, some examples of the terminal device may be: a wearable device, a wireless terminal in industrial control (industrial control), a wireless terminal in self driving (self-driving), a wireless terminal in the smart city (smart city), a wireless terminal in the smart home (smart home), or the like.

For the ease of description, descriptions are provided by using a smartwatch as an example in the embodiments of this application.

Figure 1:
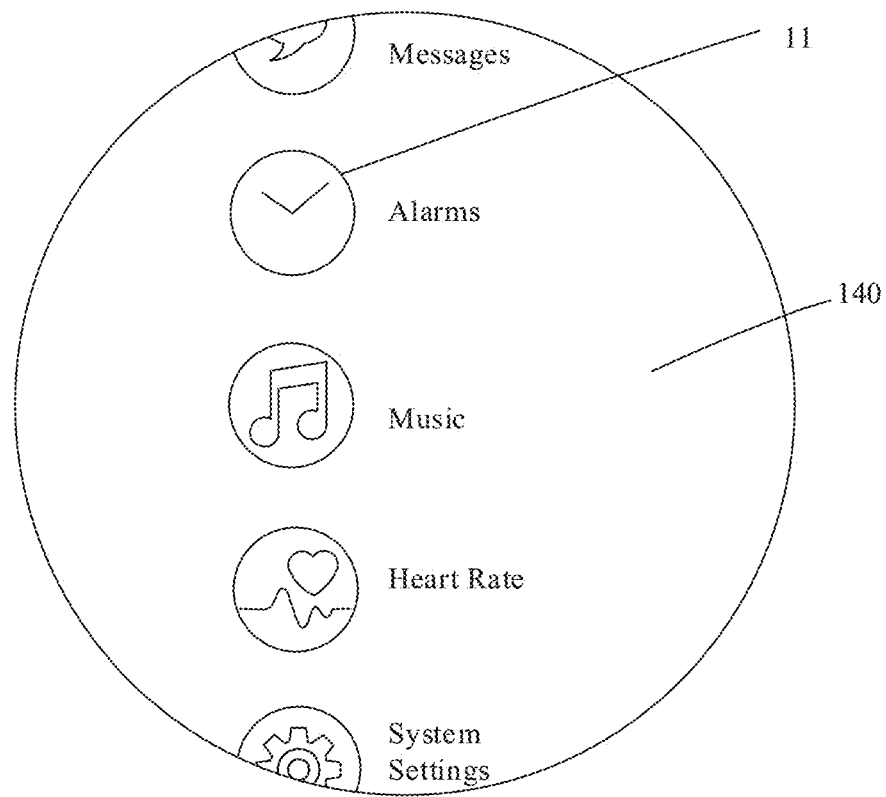
FIG. 1 is a schematic diagram of an interface of a smartwatch.

FIG. 1 is a schematic diagram of an interface of a smartwatch. As shown in FIG. 1, the smartwatch may display a fixed quantity of application icons 11 in a vertical arrangement on one screen in a desktop 140. A value of the fixed quantity is not limited. For example, in FIG. 1, one screen can display five application icons. When a quantity of application icons on the smartwatch is greater than the fixed quantity, one screen cannot display all application icons, a user can swipe up or down on the desktop 140, and in response to the swipe operation performed by the user, the smartwatch slides the application icons up or down and displays the application icons in the desktop 140. In view of the above, if the application icons are arranged vertically, the user needs to swipe a plurality of times to find a target icon, which is inconvenient to operate. Moreover, such a single-axis arrangement makes it difficult for the user to memorize positions of the application icons, resulting in poor user experience.

Figure 2:
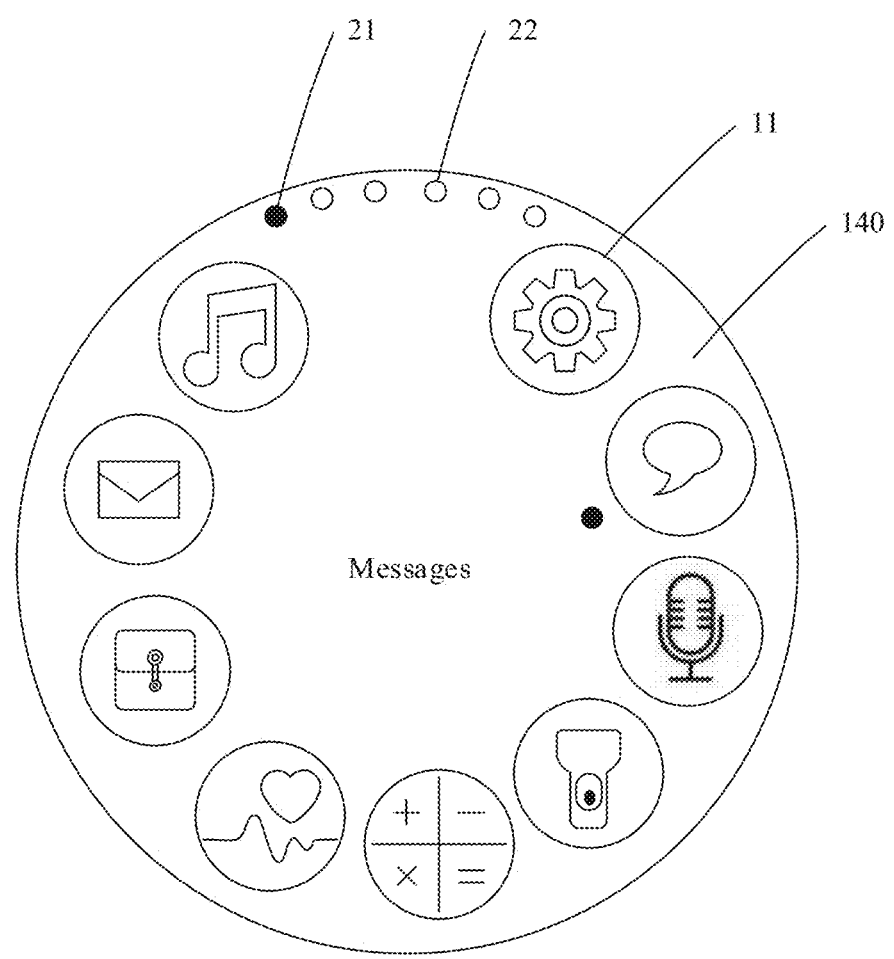
FIG. 2 is a schematic diagram of another interface of a smartwatch.

FIG. 2 is a schematic diagram of another interface of a smartwatch. As shown in FIG. 2, the smartwatch may display a fixed quantity of application icons 11 in an annular arrangement on one screen in a desktop 140. A value of the fixed quantity is not limited. For example, in FIG. 2, one screen can display nine application icons. When a quantity of application icons on the smartwatch is greater than the fixed quantity, one screen cannot display all application icons, and can display the application icons on a plurality of screens. After the first screen is full of application icons, application icons are sequentially placed on the second screen, the third screen, and the like. The desktop 140 may include an indicator icon 22, which, for example, is located at the top of the desktop 140. The indicator icon 22 is configured to indicate a quantity of screens included by the desktop 140 and a currently displayed screen. For example, in FIG. 2, there are six indicator icons 22, which indicates that the desktop 140 includes six screens. The first indicator icon 21 is black, the remaining indicator icons are white, and that the desktop 140 currently displays the first screen is indicated by a color difference. The user can switch between display of different screens of the desktop 140 by rotating a crown, and correspondingly, the smartwatch switches between display of different screens of the desk-top 140 in response to a crown rotating operation performed by the user. In a case that the application icons are displayed on a plurality of screens, when looking for a target icon, the user switches between screens a lot of times, which is inconvenient to operate. Moreover, when the user installs a new application or uninstalls an application, an application icon may consequently be moved a previous screen or a next screen. The layout of application icons is often different from positions memorized by the user, resulting in poor user experience.

The embodiments of this application provide a method for managing an application icon. In the embodiments of this application, the smartwatch displays application icons on the desktop in two views, referred to as a global view and a local view, respectively. In the global view and the local view, the smartwatch can display application icons in the desktop according to a grid arrangement (or referred to as a matrix arrangement, a checkerboard arrangement, or the like). Descriptions are provided below with reference to FIG. 3 and FIG. 4.

1. Global View

Figure 3:
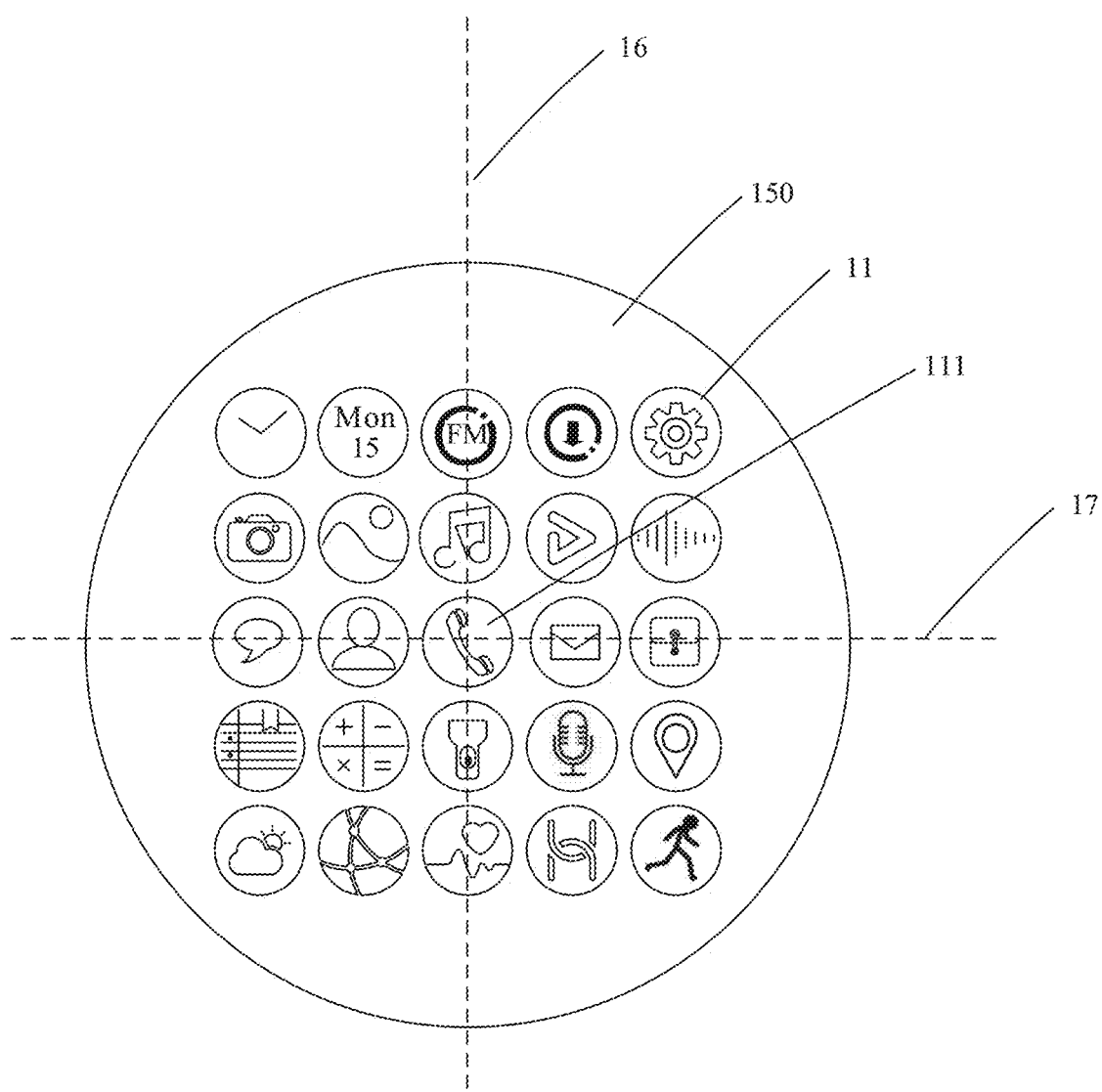
FIG. 3 is a schematic interface diagram of a smartwatch under a global view according to an embodiment of this application.

For example, as shown in FIG. 3, under a global view, the smartwatch can display all the application icons 11 on the smartwatch on one screen in a desk-top 150 in a grid arrangement. Because one screen displays all the application icons, the user can learn arrangement positions of the application icons, and quickly find a target icon, which is convenient for the user to memorize the layout of the application icons, thereby improving the user experience.

For the convenience of description, a grid formed by all the application icons on the smartwatch under the global view may be referred to as a first grid, and the first grid can be completely displayed in the desktop 150. It should be noted that the quantity of application icons, the quantities of rows and columns of the first grid, the shape of the application icon, and the display size (or size) of the application icon are not limited in this embodiment. For example, in FIG. 3, the first grid includes a total of 25 application icons in five rows and five columns, and the shape of the application icon is a circle. Optionally, the shape of the application icon may also be a square. The larger the quantity of application icons, the larger the quantities of rows and columns of the first grid, and the smaller the size of the application icon.

Optionally, to enhance the display effect of icons, the application icons in a first grid may have the same size.

Optionally, to enhance the display effect of icons, a center of the first grid is a center of the desktop 150. For the convenience of description, the center of the desktop may be referred to as reference position, specifically, a position at which an intersection between a vertical reference axis 16 and a horizontal reference axis 17 of the display screen is located. For the ease of distinction, a reference position under the global view may be referred to as a first reference position, and a reference position under the local view may be referred to as a second reference position. For example, in FIG. 3, an application icon at the first reference position is an application icon 111 (the phone application icon).

Optionally, to enhance the display effect of icons and present the center symmetry of the icon layout for the user, quantities of rows and columns of the first grid may be odd. In this case, the layout of the first grid may also be understood as: a plurality of square-shaped closed circles (subsequently referred to as closed circles) with the first reference position as the center. For example, in FIG. 3, the desktop 150 includes two closed circles centered on the first reference position, the outer closed circle includes 16 application icons, and the inner closed circle includes eight application icons.

Figure 20:
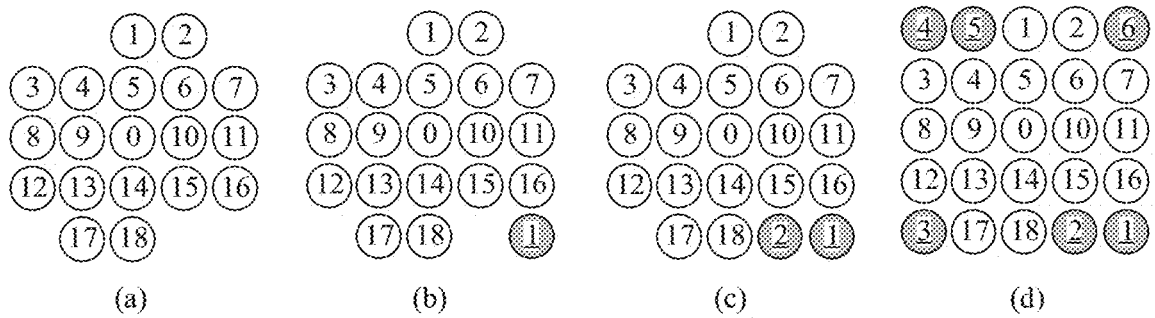
FIG. 20 is a schematic diagram of another icon position change after a new application is installed on a smartwatch according to an embodiment of this application.
Figure 21:
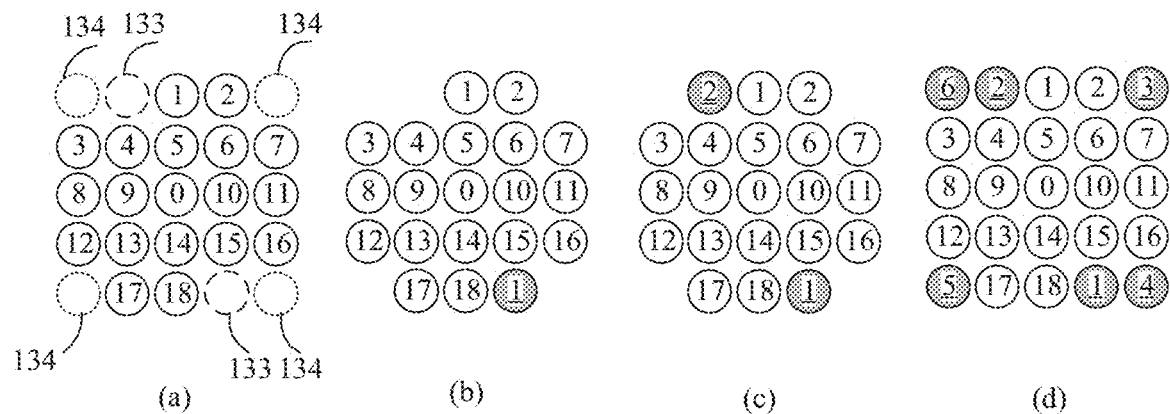
FIG. 21 is a schematic diagram of still another icon position change after a new application is installed on a smartwatch according to an embodiment of this application.
Figure 22:
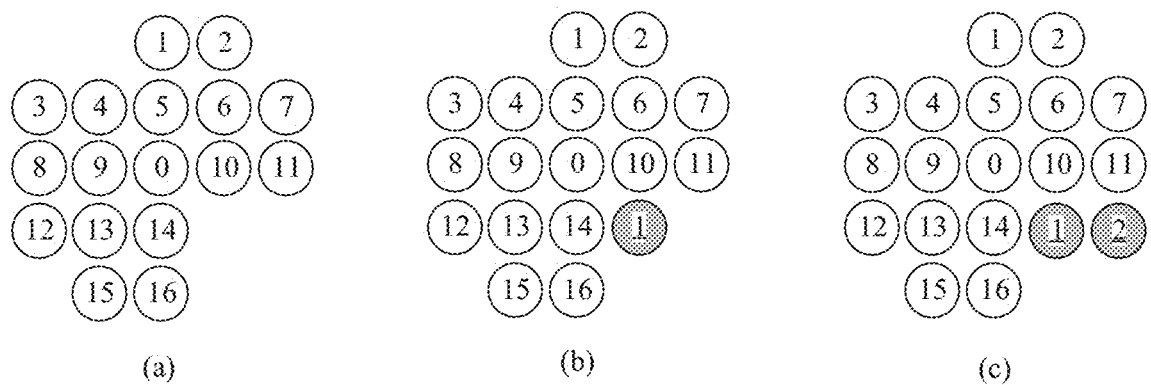
FIG. 22 is a schematic diagram of still another icon position change after a new application is installed on a smartwatch according to an embodiment of this application.

It should be noted that in an actual application, due to an operation such as installing an application, uninstalling an application, or moving application icon, a free position for an application icon may exist in the first grid or each closed circle, for example, as indicated by the forms shown in FIG. 20 to FIG. 22.

Under the global view, the user cannot change a positional relationship between application icons on the desktop. Optionally, the user cannot implement at least one of the following: running an application by clicking an application icon, moving a position of an application icon, uninstalling an application, or installing a new application. Optionally; under the global view, the user can switch the desktop from the global view to the local view through a preset operation. Refer to the relevant descriptions in the following embodiments shown in FIG. 8 and FIG. 9.

2. Local View

Figure 4:
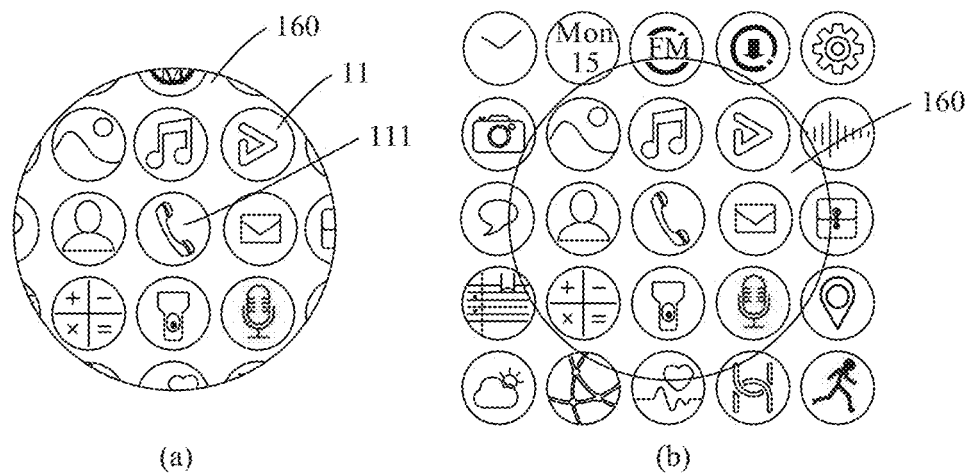
FIG. 4 is a schematic interface diagram of a smartwatch under a local view according to an embodiment of this application.

A local view is partial display of the first grid in the global view. Under the local view, the smartwatch may display a preset quantity of application icons in the desktop according to a grid arrangement. A value of the preset quantity is not limited in this embodiment. For example, as shown in FIG. 4(*a*), the preset quantity may be nine, and a desktop 160 under the local view can completely display nine application icons in a grid arrangement.

For the convenience of description and distinction, the grid formed by all the application icons on the smartwatch under the local view can be referred to as a second grid. Compared with the first grid, the second grid has a larger application icon size, but has the same quantity of rows, the quantity of columns, and the same arrangement order of application icons. The desktop under the local view displays a part of the second grid, which has the same meaning as that the desktop under the local view can display a part of the first grid. For example, FIG. 4(*b*) shows a second grid under a local view, including a displayed part in the desktop 160 and a non-displayed part outside the desktop 160. For the convenience of description, the displayed part of the second grid in the desktop 160 may also be referred to as a third grid. For example, in FIG. 4, the third grid includes nine complete application icons centered on the application icon 111.

Optionally, to enhance the display effect of icons and present the center symmetry of the icon layout for the user, quantities of rows and columns of the third grid may be odd. In this case, the layout of the third grid may also be understood as: a plurality of square-shaped closed circles (subsequently referred to as closed circles) with the second reference position as the center. For example, as shown in FIG. 4(*a*), the desktop 160 includes one closed circle centered on the second reference position. The closed circle includes eight application icons, and the application icon at the second reference position is the application icon 111.

Optionally, to enhance the display effect of icons, the application icons in the third grid may have the same size.

It should be noted that in an actual application, due to an operation such as installing an application, uninstalling an application, or moving application icon, a free position for an application icon may exist in the second grid, the third grid, or each closed circle, for example, as indicated by the forms shown in FIG. 20 to FIG. 22.

Under the local view, the user can implement at least one of the following through different preset operations: running an application by clicking an application icon, moving a position of an application icon, uninstalling an application, installing a new application, moving and displaying application icons in different regions in the second grid, or switching the desktop from the local view to the global view.

Optionally, in a scenario of displaying the desktop under the local view after the smartwatch is woken from a standby state, or in a scenario of switches the desktop from the global view to the local view, the application icons displayed in the desktop under the local view include a preset quantity of application icons centered on the first reference position under the global view. For example, referring to FIG. 3 and FIG. 4(a), nines application icons completely displayed in the desktop 160 under the local view are nine application icons with the first reference position as the center in the desktop 150.

Optionally, in an embodiment of this application, a process of awaking a smartwatch by a user is described with reference to FIG. 5. The user can awake a smartwatch in a standby state through a preset operation and display a desktop under a local view.

Figure 5:
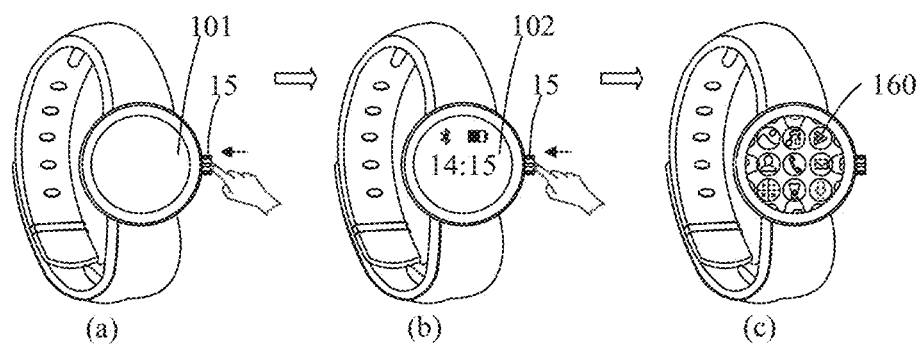
FIG. 5 is a schematic diagram of an interface change of a smartwatch after being awoken from a standby state according to an embodiment of this application.

For example, FIG. 5 is a schematic diagram of an interface change of a smartwatch after being awoken from a standby state according to an embodiment of this application. As shown in FIG. 5, when the smartwatch is in a standby state, the display screen 101 is black. The user can awake the smartwatch by pressing a crown 15. Correspondingly, the smartwatch lights up a display screen 101 in response to the crown pressing operation performed by the user, and a main interface 102 is displayed on the display screen 101, as shown in FIG. 5(b). The content included in the main interface 102 is not limited in this embodiment, and for example, may include a time, a Bluetooth icon indicating whether a Bluetooth function is enabled or not, and a battery icon indicating a remaining electricity quantity of a battery. When the smartwatch displays the main interface 102, the user can enable the display of the desktop by pressing the crown 15. Correspondingly, the smartwatch displays the desktop 160 under the local view on the display screen in response to the crown pressing operation performed by the user, as shown in FIG. 5.

Optionally, in an implementation, the desktop under the local view can be displayed according to the application icon at the first reference position under the global view, and the application icon at the first reference position under the global view is the same as the application icon at the second reference position under the local view, for example, as shown in FIG. 3 and FIG. 4(a), in this implementation, every time the desktop under the local view is entered, application icons displayed under the local view remain unchanged, which facilitates the long-term memory of the user.

Optionally, in another implementation, the smartwatch can display the desktop under the local view before the display screen went black last time. In this implementation, the continuity of desktop display under a local view is considered, which facilitates the short-term memory of the user. This implementation can be applied to a scenario in which a time interval between the smartwatch entering the standby state and the smartwatch being awakened. The time interval is not limited in this embodiment.

It should be noted that the preset operation performed by the user for awaking the smartwatch is not limited in this embodiment. For example, the user presses the crown once, or the user quickly and successively presses the crown twice or inputs voice.

Figure 6:
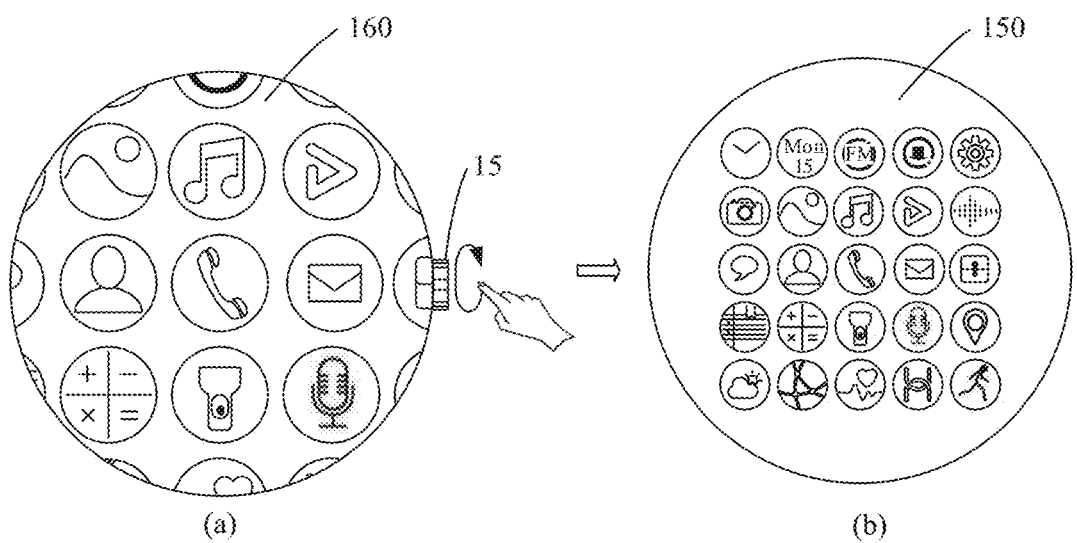
FIG. 6 is a schematic diagram of an interface change of a smartwatch from a local view to a global view according to an embodiment of this application.
Figure 7:
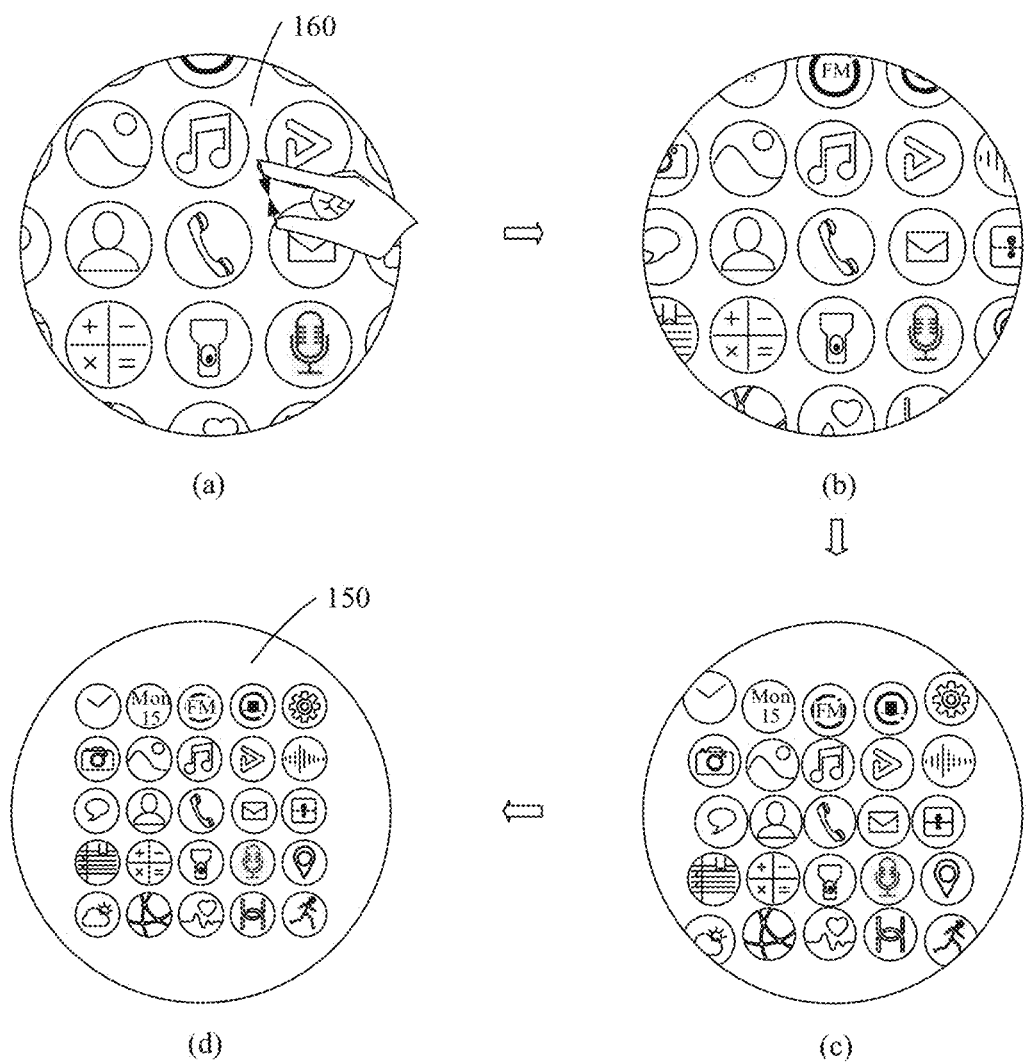
FIG. 7 is another schematic diagram of an interface change of a smartwatch from a local view to a global view according to an embodiment of this application.

Optionally, in an embodiment of this application, with reference to FIG. 6 and FIG. 7, the switching the desktop from the local view to the global view is explained. In this embodiment, the user can switch the desktop under the local view to the desktop under the global view through a preset operation.

Optionally, in an implementation, FIG. 6 is a schematic diagram of an interface change of a smartwatch from a local view to a global view according to an embodiment of this application. The preset operation may be rotating the crown 15. As shown in FIG. 6(a), the smartwatch currently displays the desktop 160 under the local view. Positions of application icons displayed on the desktop 160 in the first grid under the global view are not limited in this embodiment. The user switches from the local view to the global view by rotating the crown 15. Correspondingly, the smartwatch switches the desktop from the local view to the global view in response to the operation of rotating the crown 15 performed by the user. Referring to FIG. 6(b), the smartwatch displays the desktop 150 under the global view. A rotation direction of the crown 15 is not limited in this embodiment, and may be a preset rotation direction.

Optionally, in another implementation, FIG. 7 is a schematic diagram of another interface change of a smartwatch from a local view to a global view according to an embodiment of this application. The preset operation may be a two-finger pinching operation. As shown in FIG. 7(a), the smartwatch currently displays the desktop 160 under the local view. The user can perform a pinching operation on the desktop 160, and move the thumb and the index finger close to each other, to switch from the local view to the global view. Correspondingly, the smartwatch switches the desktop from the local view to the global view in response to the pinching operation performed by the user. Referring to FIG. 7(d), the smartwatch displays the desktop 150 under the global view. A pinching direction of the two fingers is not limited in this embodiment, and for example, may also be moving the two fingers away from each other. Usually, based on the understanding habit of the user, when the two fingers move close to perform a pinching operation, the size of the application icons is reduced, more application icons are displayed, and the desktop is switched from a local mode to a global mode.

A position at which the user performs a pinching operation is not limited in this embodiment.

Optionally, to enhance the dynamic effect of display switching, in a process of switching the desktop from the local view to the global view, an interface change can be dynamically presented by displaying a key frame. For distinction from a scenario of switching the desktop from the global view to the local view, the key frame in this embodiment may be referred to as a first key frame. At least one first key frame can be preset on the smartwatch. Third grids in different first key frames include different quantities of rows and different quantities of columns, application icons are proportionally zoomed out as the quantity of rows and the quantity of columns of the third grid increase. The quantity of first key frames is not limited in this embodiment. For example, in FIG. 7, there are two first key frames, as shown in FIG. 7(b) and FIG. 7(c). In a process of switching the desktop from the local view to the global view, the quantity of rows and the quantity of columns of the third grid gradually increase, and the size of the application icons is gradually zoomed out. Optionally, a display ratio of the first key frame may be a preset zoom ratio. For example, a ratio of a size of the application icons under the local view to a size of the application icons under the global view is R, and the preset zoom ratio may be a value greater than 1 and less than R. For example, there are two first key frames, and preset zoom ratios may be 1+1/4=5/4 and 1+3/4=7/4 respectively. Optionally, to enhance the uniformity and smoothness of the animation display effect, the preset zoom ratio may be an average value between 1 and R, for example, 1+1/n, 1+2/n, ..., 1+(n−1)/n, where n represents a quantity of first key frames.

Optionally, sides of a third grid in the first key frame may be curved, for example, as shown in FIG. 7(c), so that the dynamic change effect of the display switching of the desktop.

It should be noted that this embodiment and other embodiments of this application can be combined with each other, and a combination manner, a quantity of times of combination, and a combination sequence are not limited. For example, this embodiment can be combined with the embodiment shown in FIG. 5. After being awoken, the terminal device displays the desktop under the local view, and can switch, through an operation performed the user in this embodiment, from display of the desktop under the local view to display of the desktop under the global view.

Figure 8:
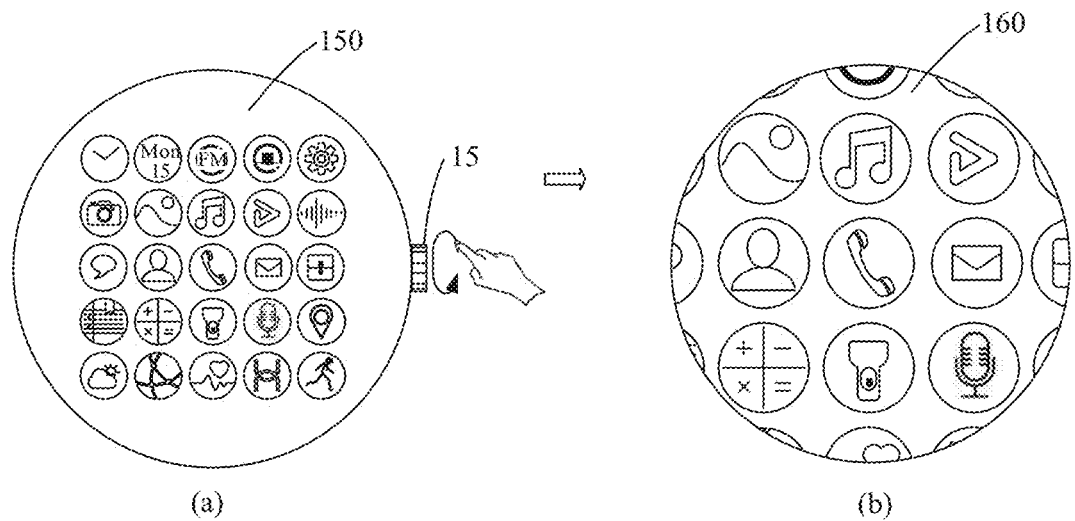
FIG. 8 is a schematic diagram of an interface change of a smartwatch from a global view to a local view according to an embodiment of this application.
Figure 9:
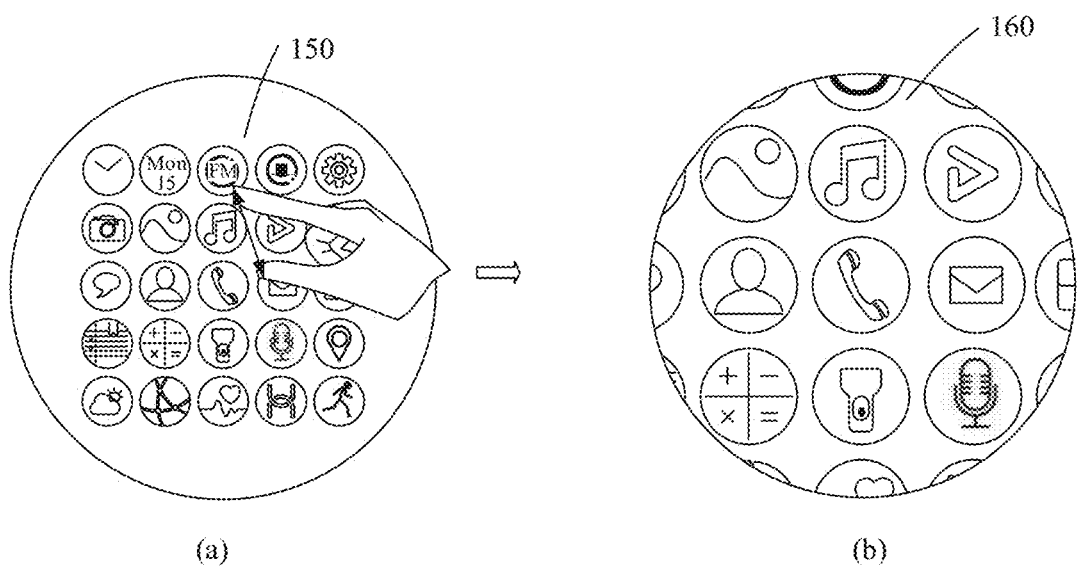
FIG. 9 is a schematic diagram of another interface change of a smartwatch from a global view to a local view according to an embodiment of this application.

Optionally, in an embodiment of this application, with reference to FIG. 8 and FIG. 9, the switching the desktop from the global view to the local view is explained. In this embodiment, the user can switch the desktop under the global view to the desktop under the local view through a preset operation.

Optionally, in an implementation, FIG. 8 is a schematic diagram of an interface change of a smartwatch from a global view to a local view according to an embodiment of this application. The preset operation may be rotating the crown 15. A rotation direction of the crown 15 is opposite to the rotation direction of the crown in the embodiment shown in FIG. 6. As shown in FIG. 8(a), the smartwatch currently displays the desktop 150 under the global view. The user switches from the global view to the local view by rotating the crown 15. Correspondingly, the smartwatch switches the desktop from the global view to the local view in response to the operation of rotating the crown 15 performed by the user. Referring to FIG. 8(b), the smartwatch displays the desktop 160 under the local view.

Optionally, in another implementation, FIG. 9 is a schematic diagram of another interface change of a smartwatch from a global view to a local view according to an embodiment of this application. The preset operation may be a two-finger pinching operation. A pinching direction of the two fingers is opposite to the pinching direction of the two fingers in the embodiment shown in FIG. 7. As shown in FIG. 9(a), the smartwatch currently displays the desktop 150 under the global view. The user can perform a pinching operation on the desktop 150, and move the thumb and index finger away from each other, to switch from the global view to the local view. Correspondingly, the smartwatch switches the desktop from the global view to the local view in response to the pinching operation performed by the user. Referring to FIG. 9(b), the smartwatch displays the desktop 160 under the local view.

A position at which the user performs a pinching operation is not limited in this embodiment.

Optionally, to enhance the dynamic effect of display switching, in a process of switching the desktop from the global view to the local view, an interface change can be dynamically presented by displaying a key frame. For distinction from a scenario of switching the desktop from the local view to the global view, the key frame in this embodiment may be referred to as a second key frame. At least one second key frame can be preset on the smartwatch. Third grids in different second key frames include different quantities of rows and different quantities of columns, application icons are proportionally zoomed in as the quantity of rows and the quantity of columns of the third grid decrease. The quantity of third key frames is not limited in this embodiment. A display ratio of the second key frame may be a preset zoom ratio. Optionally, the quantity of second key frames and the preset zoom ratio in the process of switching the desktop from the global view to the local view can be the same as the quantity of first key frames and the preset zoom ratio in the process of switching the desktop from the local view to the global view. The second key frame is similar to the first key frame, and is an intermediate state w% ben the desktop switches between the local view and the global view. Refer to FIG. 7(b) and FIG. 7(c) and related instructions. Details are not described herein again.

It should be noted that the preset operation performed by the user for switching the desktop from the global view to the local view is not limited in this embodiment, and may be, for example, clicking an application icon, double-clicking an application icon, or inputting voice.

It should be noted that this embodiment and other embodiments of this application can be combined with each other, and a combination manner, a quantity of times of combination, and a combination sequence are not limited. For example, this embodiment can be combined with the embodiments shown in FIG. 6 and FIG. 7, to implement switching between the desktop under the local view and the desktop under the global view.

Figure 10:
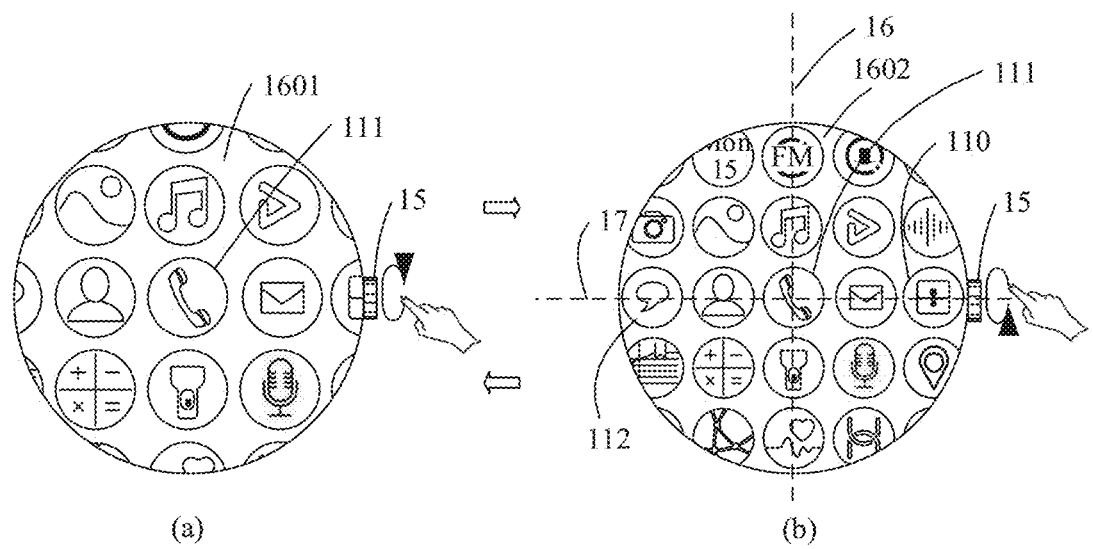
FIG. 10 is a schematic diagram of an interface change of a smartwatch performing local-view 2-level display according to an embodiment of this application.
Figure 11:
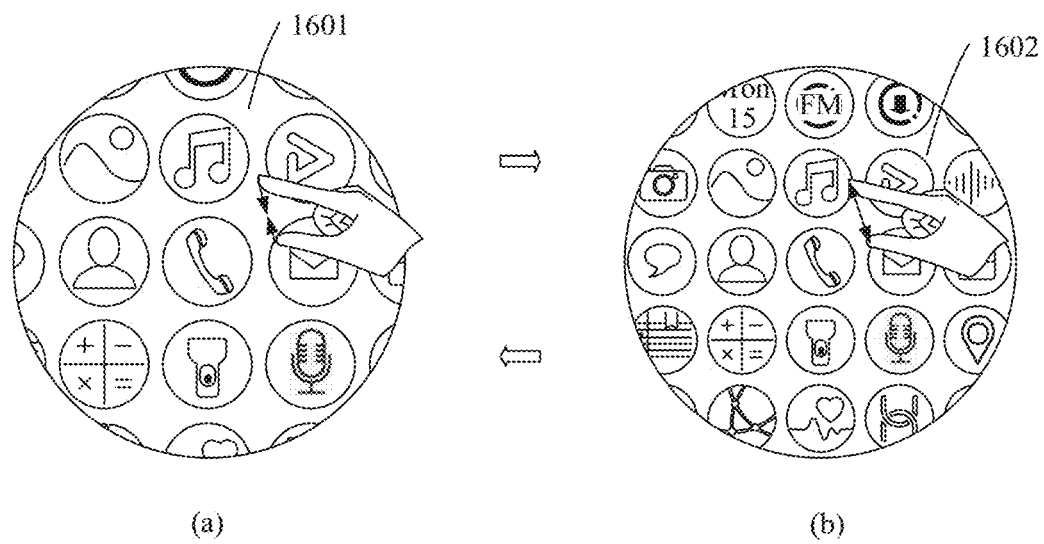
FIG. 11 is a schematic diagram of another interface change of a smartwatch performing local-view 2-level display according to an embodiment of this application.
Figure 12:
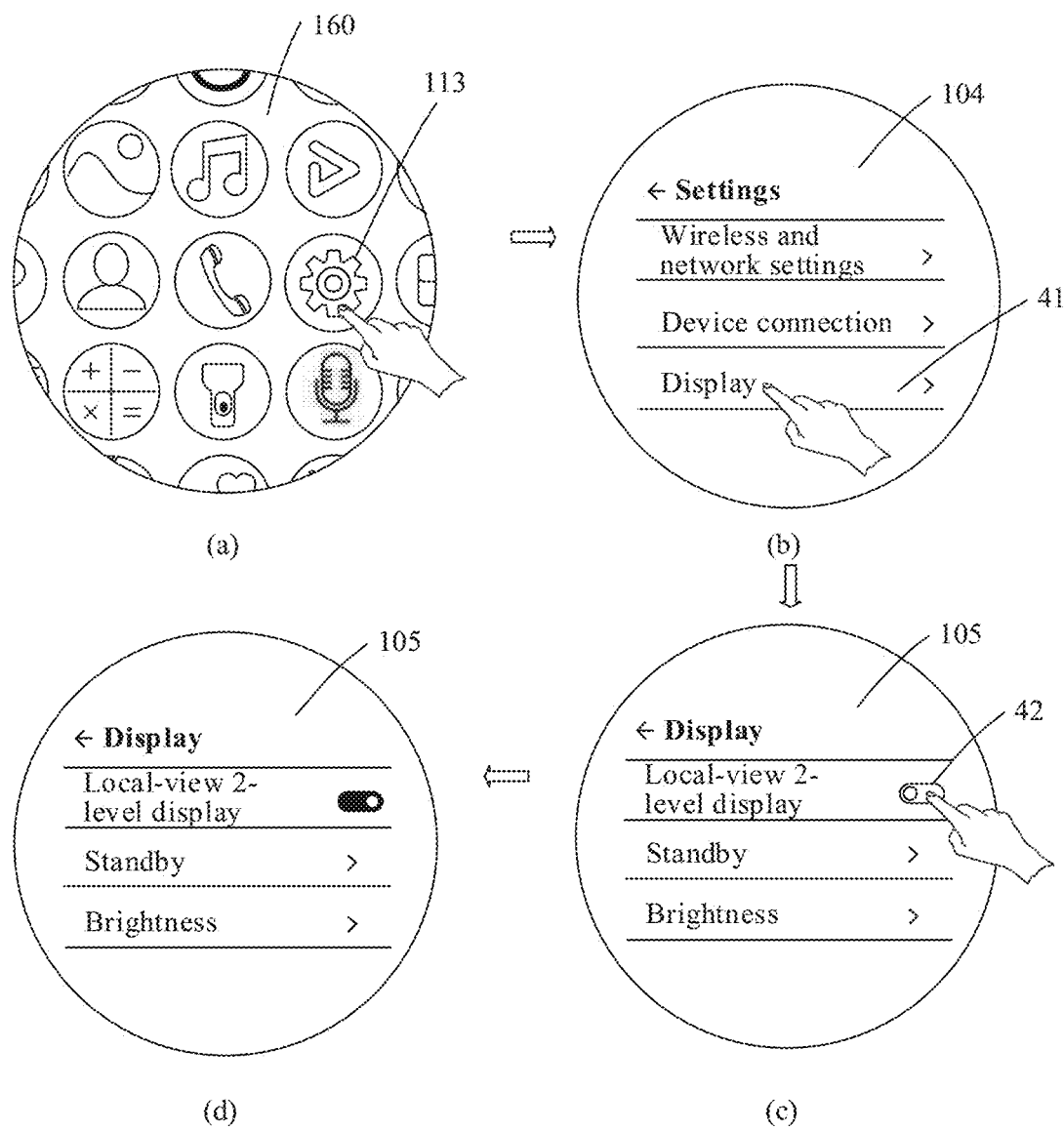
FIG. 12 is a schematic diagram of an interface change of setting local-view 2-level display according to an embodiment of this application.

Optionally, in an embodiment of this application, with reference to FIG. 10 to FIG. 12, a desktop displayed under a local view is described. In this embodiment, the smartwatch may include a plurality of desktops under a local view, and application icons displayed in different desktops have different quantities and different sizes. The quantity of desktops under a local view and the quantity and size of application icons displayed in each desktop are not limited in this embodiment. The user can switch between display of different desktops by performing a preset operation on the desktop. The preset operation is not limited in this embodiment. For example, this embodiment is described by using an example in which two desktops are included under the local view.

Optionally, in an implementation, FIG. 10 is a schematic diagram of an interface change of a smartwatch performing local-view 2-level display according to an embodiment of this application. The preset operation may be rotating the crown 15. The two desktops under the local view are shown as FIG. 10(a) and FIG. 10(b), respectively. In FIG. 10(a), a desktop 1601 includes nine complete application icons. FIG. 10(b) is relative to FIG. 10(a), and in a desktop 1602 shown in FIG. 10(b), a quantity of application icons is larger, and a size of the application icons is smaller. In addition to including the nine complete application icons in the desktop 1601, the desktop 1602 further includes four complete application icons located on a vertical reference line 16 and a horizontal reference line 17, for example, an application icon 110 and an application icon 112. As shown in FIG. 10(a), the smartwatch currently displays the desk-top 1601 under the local view. Positions of application icons displayed on the desktop 1601 in the first grid under the global view are not limited in this embodiment. The user rotates the crown 15, where a rotation direction of the crown 15 is the same as a rotation direction of the crown in the embodiment shown in FIG. 6, to switch the desk-top 1601 to the desktop 1602 shown in FIG. 10(b). Correspondingly, the smartwatch determines, in response to the operation of rotating the crown 15 performed by the user, a to-be-switched-to desktop according to the rotation direction of the crown, and switches to displaying the to-be-switched-to desktop. In the process of switching desktop display, an application icon located at a second reference position in the desktop under the local view remains unchanged. For example, in FIG. 10, the application icon located at the second reference position is an application icon 111 in both the desktop 1601 and the desktop 1602.

Similarly, as shown in FIG. 10(b), the user rotates the crown 15, where a rotation direction of the crown 15 is the same as a rotation direction of the crown in the embodiment shown in FIG. 8, to switch the desktop 1602 to the desktop 1601 shown in FIG. 10(a).

Optionally, if the smartwatch includes at least 3 desktops under the local view, each time the user performs a preset operation, display of the current desktop can be switched to display of a desktop that is adjacent to a display size of the current desktop. For example, four desktops are included under the local view, which are sequentially marked as a desktop 1 to a desktop 4 after being sorted in ascending order according to a quantity of application icons displayed in a desktop. The desktop 2 is currently displayed, and when the user rotates the crown 15 according to the crown rotation direction shown in FIG. 10(a), it is switched from the display of the desktop 2 to the display of the desktop 3. The user continuously rotates the crown 15 according to the direction, and can switch from the display of the desktop 3 to the display of the desktop 4.

Optionally, in another implementation, FIG. 11 is a schematic diagram of another interface change of a smartwatch performing local-view 2-level display according to an embodiment of this application. The preset operation may be a two-finger pinching operation.

As shown in FIG. 11(a), the smartwatch currently displays the desktop 1601 under the local view. The user may perform a pinching operation on the desktop 1601, where a pinching direction of the two fingers is the same as the pinching direction of the two fingers in the embodiment shown in FIG. 7, which is moving the thumb and the index finger to approach each other, to switch the desktop 1601 to the desktop 1602 shown in FIG. 11(b). Correspondingly, the smartwatch determines, in response to the pinching operation performed by the user, a to-be-switched-to desktop according to the pinching direction of the two fingers, and switches to displaying the to-be-switched-to desktop. Similarly, as shown in FIG. 11(b), the user may perform a pinching operation on the desktop 1602, where a pinching direction of the two fingers is the same as the pinching direction of the two fingers in the embodiment shown in FIG. 9, which is moving the thumb and the index finger away from each other, to switch the desktop 1602 to the desktop 1601 shown in FIG. 11(a).

A position at which the user performs a pinching operation is not limited in this embodiment.

Optionally, in this embodiment, the user can set whether the smartwatch can switch between display of a plurality of desktops under a local view. A reference desktop under the local view may be preset on the smartwatch. If the smartwatch is set to not switch between display of a plurality of desktops under a local view, the smartwatch only displays the reference desktop under the local view. For example, FIG. 12 is a schematic diagram of an interface change of setting local-view 2-level display according to an embodiment of this application. As shown in FIG. 12(a), the smartwatch currently displays the desktop 160 under the local view. The user can click an application icon 113, to run a setting application corresponding to the application icon 113. Correspondingly, the smartwatch displays a main interface 104 of an application in response to the operation of clicking the application icon 113 performed by the user, as shown in FIG. 12(b). The main interface 104 of the setting application includes a plurality of function tabs, for example, a "Wireless and network settings" tab and a "Device connection" tab. The user can click a "Display" tab 41, to open a display application. Correspondingly, the smartwatch displays a main interface 105 of the display application in response to the operation of clicking the "Display" tab 41 performed by the user, as shown in FIG. 12(c). The main interface 105 of the display application may include a "Local-view 2-level display" switch control 42. "Local-view 2-level display" means that the smartwatch includes two desktops under a local view, and can switch between display of the two desktops. Optionally, the "Local-view 2-level display" function is disabled by default. The user can click the switch control 42 to enable the "Local-view 2-level display" function. Correspondingly, the smartwatch enables the "Local-view 2-level display" function in response to the operation of clicking the switch control 42 performed by the user, as shown in FIG. 12(d).

It should be noted that in this embodiment, any desktop under a local view can be a desktop under a local view in other embodiments of this application.

For example, with reference to FIG. 10, an application scenario of the method for managing an application icon provided in this embodiment may be that, a smartwatch currently displays a desktop 1601. A user wants to swap positions of an application icon 112 and an application icon 110. The user switches a desktop 1601 to a desktop 1602 by rotating a crown 15. The user drags the application icon 112 to a position of the application icon 110 in the desktop 1602, to swap the application icon 112 and the application icon 110.

It should be noted that this embodiment and other embodiments of this application can be combined with each other, and a combination manner, a quantity of times of combination, and a combination sequence are not limited. For example, this embodiment can be combined with the embodiments shown in FIG. 6, FIG. 7, FIG. 8, and FIG. 9, to implement switching between display of the desktop under the local view and display of the desktop under the global view.

Figure 13:
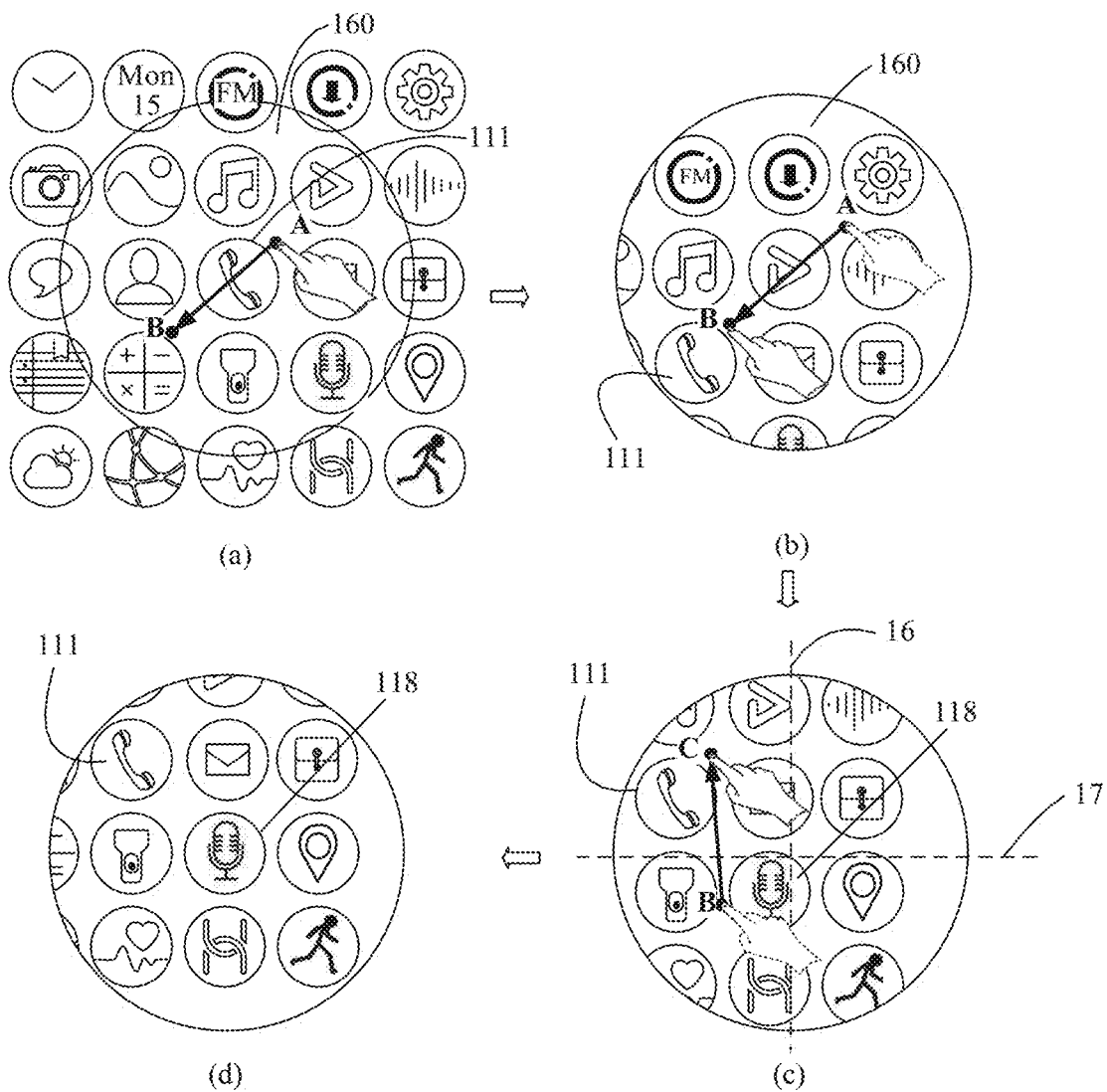
FIG. 13 is a schematic diagram of an interface change of a smartwatch when an application icon is moved and displayed under a local view according to an embodiment of this application.
Figure 14:
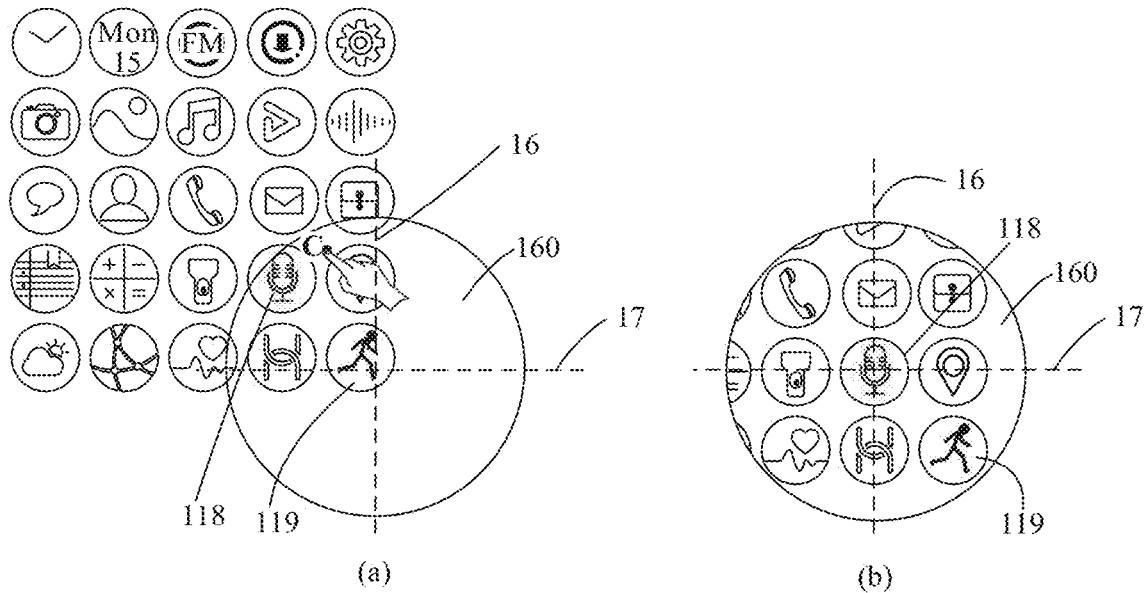
FIG. 14 is a schematic diagram of another interface change of a smartwatch when an application icon is moved and displayed under a local view according to an embodiment of this application.

Optionally, in an embodiment of this application, with reference to FIG. 13 and FIG. 14, moving and displaying application icons in a desktop under a local view is described.

The local view is partial display of the first grid in the global view, and in the desktop under the local view, a quantity of displayed application icons is limited. The user can move and display, through a preset operation, application icons displayed in the desktop under the local view as a whole, so as to display application icons in different regions in the first grid in the desktop under the local view, which is convenient for operations subsequently performed by the user. It should be noted that the preset operation is not limited in this embodiment.

For example, FIG. 13 is a schematic diagram of an interface change of a smartwatch when an application icon is moved and displayed under a local view according to an embodiment of this application. As shown in FIG. 13(a), the smartwatch currently displays the desktop 160 under the local view. For the ease of description, FIG. 13(a) shows a second grid. As shown in FIG. 13(a) to FIG. 13(d), after long-pressing a position A in the desktop 160, a finger of the user starts to swipe from the position A. and sequentially swipes to a position B and a position C. The user lifts the finger at the position C, and the swipe operation ends. Correspondingly, the smartwatch obtains, in response to the swipe operation performed by the user, a first position, a second position, and a swiping trajectory of the swipe operation, where the first position is a starting position of the swipe operation, and the second position is an end position of the swipe operation; determines a first reference point corresponding to the first position in the second grid according to the first position, and controls the second grid to move as a whole with the first reference point as a center and according to the swiping trajectory; determines a reference application icon in the second grid according to a center (or the second reference position) of the desktop 160 and position information of the application icons in the second grid after moving the first reference point to the second position, where the reference application icon is an application icon displayed at the center of the desktop 160 after the swipe operation performed by the user ends; determining to-be-displayed application icons in the desktop 160 according to the reference application icon; and displaying the to-be-displayed application icons in the desktop 160. Specifically, in FIG. 13, the first position is the position A, the second position is the position C, and the first reference point (not shown) may be a point at which the position A is located in the second grid. The second grid is controlled to move as a whole with the first reference point as a center and according to the swiping trajectory. Refer to a position change of the application icon 111. In a process in which the user performs a swipe operation, application icons displayed in the desktop 160 present an effect that the application icons move with the hand, so that application icons in different regions in the second grid (which may also be understood as different regions in the first grid) are displayed. As shown in FIG. 13(*c*), when the user lifts the finger after swiping the finger to the position C, the first reference point is moved to the position C. The center of the desk-top 160 is an intersection between a vertical reference axis 16 and a horizontal reference axis 17, and it can be determined according to the center of the desktop 160 that the reference application icon is an application icon 118. It can be determined according to the application icon 118 that to-be-displayed application icons of the desktop 160 include a total of nine application icons in three rows and three columns centered on the application icon 118 in the second grid, and the nine application icons are displayed in the desktop 160, as shown in FIG. 13(*d*).

Optionally, in an implementation, the determining a reference application icon in the second grid according to a center of the desktop 160 and position information of the application icons in the second grid may include: obtaining distances between the application icons in the second grid and the center of the desktop 160, and determining a first application icon with the minimum distance as the reference application icon. Optionally, if there are a plurality of first application icons with the minimum distance, any one of the first application icon can be determined as the reference application icon. Optionally, a distance between an application icon and the center of the desk-top 160 may be a distance between a center of the application icon and the center of the desktop 160.

Optionally, to improve the display effect of application icons under the local view and avoid that the application icons are not displayed in some regions in the desktop, in another implementation, the determining a reference application icon in the second grid according to a center of the desktop 160 and position information of the application icons in the second grid may include: obtaining distances between the application icons in the second grid and the center of the desktop 160. For a first application icon with the minimum distance, in the second grid, it is determined whether quantities Y of application icons in a vertical upward direction, a vertical downward direction, a horizontal leftward direction, and a horizontal rightward direction of the first application icon are greater than or equal to X, where X=⌊Quantity of rows or quantity of columns displayed in a desktop under a local view/2⌋. If the quantities of application icons in the vertical upward direction, the vertical downward direction, the horizontal leftward direction, and the horizontal rightward direction are all greater than or equal to X, then the first application icon is determined as the reference application icon. If a quantity of application icons in a first direction in the vertical upward direction, the vertical downward direction, the horizontal leftward direction, and the horizontal rightward direction is less than X, an application icon that is away from the first application icon by X-Y positions in an opposite direction of the first direction is determined as the reference application icon. There may be one or more first directions. For example, referring to FIG. 14, assuming that a total of nine application icons in three rows and three columns can be displayed in the desktop 160 under the local view, X=1. For the ease of description, FIG. 14(*a*) shows a second grid. As shown in FIG. 14(*a*), when the user lifts the finger after swiping the finger on the desktop 160 to the position C, the swipe operation ends. The smartwatch obtains distances between application icons in the second grid and the center of the desktop 160 (an intersection between a vertical reference axis 16 and a horizontal reference axis 17), and determines a first application icon with the minimum distance as an application icon 119. In the second grid, there are four application icons in a vertical upward direction of the application icon 119, there is no application icon in a vertical downward direction of the application icon 119, there are four application icons in a horizontal leftward direction of the application icon 119, and there is no application icon in a horizontal rightward direction of the application icon 119. The first direction includes the vertical downward direction and the horizontal rightward direction, in both of which Y is 0, and X−Y=1. If an application icon that is away from the application icon 119 by one position in the vertical upward direction and that is away from the application icon 119 by one position in the horizontal leftward direction is an application icon 118, then the application icon 118 is determined as the reference application icon. After the swipe operation performed by the user ends, for display of a desktop under a local view, refer to FIG. 14(*b*). In view of this, if the application icon 119 is displayed at the center of the desktop 160, then no application icon is displayed on the right and lower sides of the desktop 160, and the application icon 118 is displayed at the center of the desktop 160, so that the desktop under the local view can present a complete grid layout, thereby enhancing the display effect.

Optionally, if a duration during which the user performs the swipe operation is less than a preset duration, after the user lifts the finger, the second grid returns to an original position, and display of the desktop under a local view remains unchanged, thereby preventing an icon display change caused by a misoperation performed by the user.

Optionally, a swiping trajectory of a swipe operation may include a plurality of trajectory points. In this embodiment, a starting position, an end position, and a swiping trajectory of the swipe operation performed by the user are not limited.

For example, the starting position of the swipe operation can be any blank position in the desktop.

It should be noted that this embodiment and other embodiments of this application can be combined with each other, and a combination manner, a quantity of times of combination, and a combination sequence are not limited. For example, this embodiment can be combined with the embodiments shown in FIG. 6 and FIG. 7. After the user moves and displays application icons under the local view, it switches to display of the desktop under the global view. In another example, this embodiment can be combined with the embodiments shown in FIG. 10 to FIG. 12, so that the application icons can be moved and displayed in different desktops under the local view.

Optionally, in an embodiment of this application, with reference to FIG. 15 to FIG. 18, position changes of application icons when an application is uninstalled under a local view are described. In this embodiment, a user can uninstall an application under a local view through a preset operation.

Figure 15:
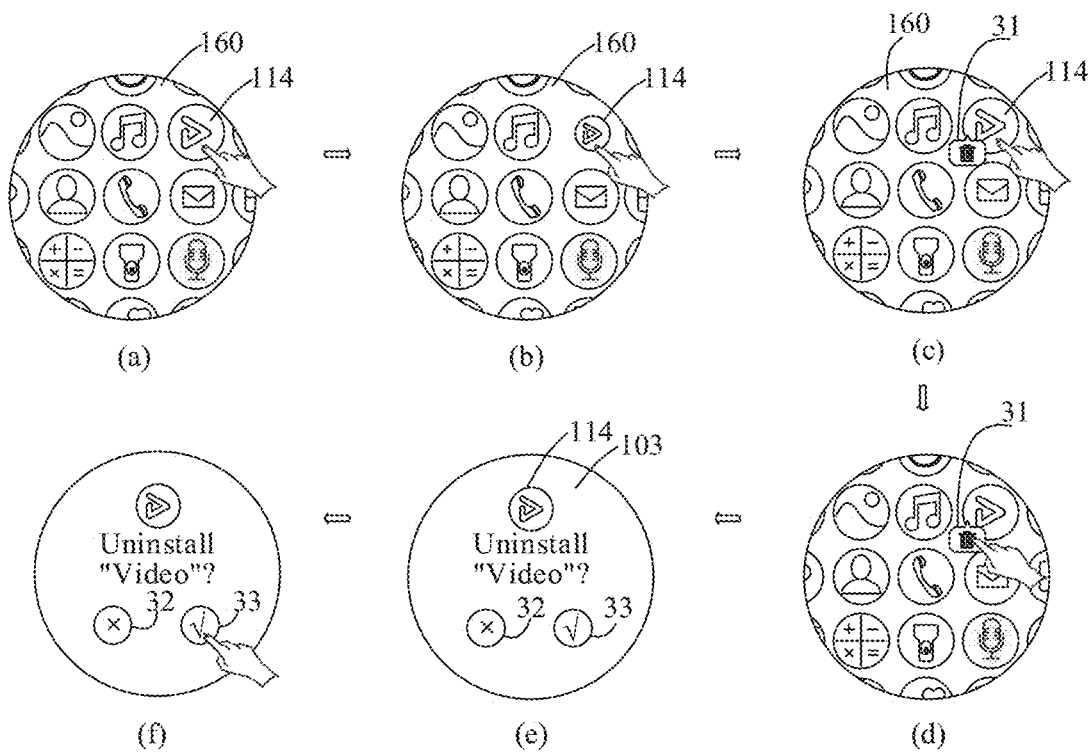
FIG. 15 is a schematic diagram of an interface change of a smartwatch when a user uninstalls an application according to an embodiment of this application.

For example, FIG. 15 is a schematic diagram of an interface change of a smartwatch when a user uninstalls an application according to an embodiment of this application. As shown in FIG. 15(*a*), the smartwatch currently displays the desktop 160 under the local view. The user can uninstall a video application by long-pressing an application icon 114 in a desktop 160. Correspondingly, the smartwatch pops up an uninstall box 31 in the desktop 160 in response to the operation of long-pressing the application icon 114 performed by the user, as shown in FIG. 15 (*c*), and the uninstall box 31 may include a recycle bin key. As shown in FIG. 15(*d*), the user can click the recycle bin key in the uninstall box 31, to continue uninstalling the video application. Correspondingly, the smartwatch displays an uninstall confirmation interface 103 in response to an operation of clicking the recycle bin key performed by the user, as shown in FIG. 15(*e*). The uninstall confirmation interface 103 may include the application icon 114, a key 32, a key 33, and prompt information, for example, "Uninstall 'Video'?", used for further prompting the user whether to continue uninstalling the application. As shown in FIG. 15(*f*), the user can click the key 33 to confirm to continue uninstalling the video application. Correspondingly, the smartwatch uninstalls the video application in response to the operation of clicking the key 33 performed by the user.

Optionally, to enhance the display effect, after the smartwatch responds to the operation of long-pressing the application icon 114 performed by the user, before the uninstall box 31 is popped up, the size of the application icon 114 can be zoomed out, as shown in FIG. 15(*b*), for dynamically promoting the user that an operation is currently performed on the application icon 114, and presenting an animation effect.

It should be noted that FIG. 15 does not limit the operation of uninstalling an application performed by the user, which may be another preset operation.

After the user uninstalls the application under the local view, in the desktop under the local view, there is a vacant space at the position of the application icon corresponding to the uninstalled application, and positions of other application icons need to be adjusted to fill the vacant space. In this embodiment, using an example in which the second grid is a total of 49 application icons in seven rows and seven columns, position adjustment of the application icons in a scenario of uninstalling an application is described.

Figure 16:
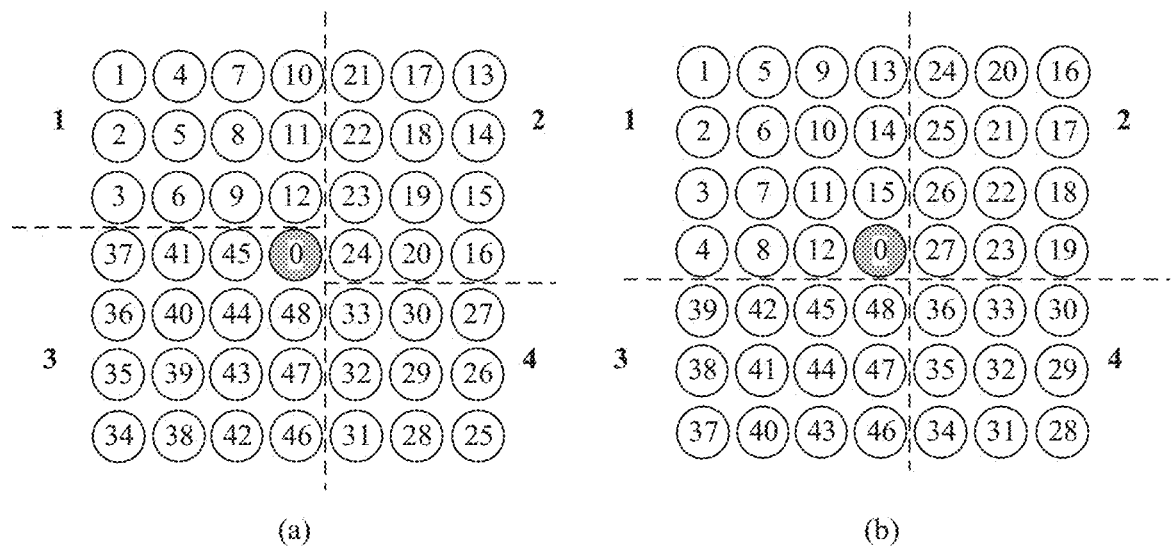
FIG. 16 is a schematic diagram of a division manner of a region to which an application belongs according to an embodiment of this application.

For the ease of description, the second grid is divided into regions with a second reference position as a center. For example, FIG. 16 is a schematic diagram of a division manner of a region to which an application belongs according to an embodiment of this application. In FIG. 16, the second grid includes a total of 49 application icons in seven rows and seven columns, which are marked as an application icon 0 to an application icon 48. The application icon 0 is located at a second reference position in the desktop under the local view. Optionally, in an implementation, as shown in FIG. 16(*a*), the second grid is divided into four regions with the application icon 0 as a center. A region 1 includes a total of 12 application icons in three rows and four columns, a region 2 includes a total of 12 application icons in four rows and three columns, a region 3 includes a total of 16 application icons in four rows and four columns, and a region 4 includes a total of nine application icons in three rows and three columns. Optionally, in another implementation, as shown in FIG. 16(*b*), the second grid is divided into four regions with the application icon 0 as a center. A region 1 includes a total of 16 application icons in four rows and four columns, a region 2 includes a total of 12 application icons in four rows and three columns, a region 3 includes a total of 12 application icons in three rows and four columns, and a region 4 includes a total of nine application icons in three rows and three columns.

For the ease of description, the application icon uninstalled by the user may be referred to as a target application icon, and a position at which the target application icon is located may be referred to as a target position.

Optionally, in this embodiment, after the target application icon is uninstalled, the method for managing an application icon may include:

determining whether a first application icon adjacent to the target application icon exists in a first direction in a region in which the target application icon is located;

sequentially moving, if the first application icon adjacent to the target application icon exists in the first direction, all application icons between the first application icon and a second application icon (including the first application icon and the second application icon) according to an opposite direction of the first direction, to fill the target position, where the second application icon is the last application icon of the target application icon in the first direction; determining whether a third application icon adjacent to a first position exists in a second direction, where the first position is a position of the second application icon before the moving; sequentially moving, if the third application icon adjacent to the first position exists in the second direction, all application icons between the third application icon and a fourth application icon (including the third application icon and the fourth application icon) according to an opposite direction of the second direction, to fill the first position, where the fourth application icon is the last application icon at the first position in the second direction;

determining, if no first application icon adjacent to the target application icon is exists in the first direction, whether a fifth application icon adjacent to the target application icon exists in the second direction; and sequentially moving, if the fifth application icon adjacent to the target application icon exists in the second direction, all application icons between the fifth application icon and a sixth application icon (including the fifth application icon and the sixth application icon) according to the opposite direction of the second direction, to fill the target position, where the sixth application icon is the last application icon of the target application icon in the second direction.

Optionally, in an implementation, the first direction is a direction away from the center of the desktop under the local view in a vertical direction, and the second direction is a direction away from the center of the desktop under the local view in a horizontal direction.

Optionally, in another implementation, the first direction is a direction away from the center of the desk-top under the local view in a horizontal direction, and the second direction is a direction away from the center of the desktop under the local view in a vertical direction.

Figure 17:
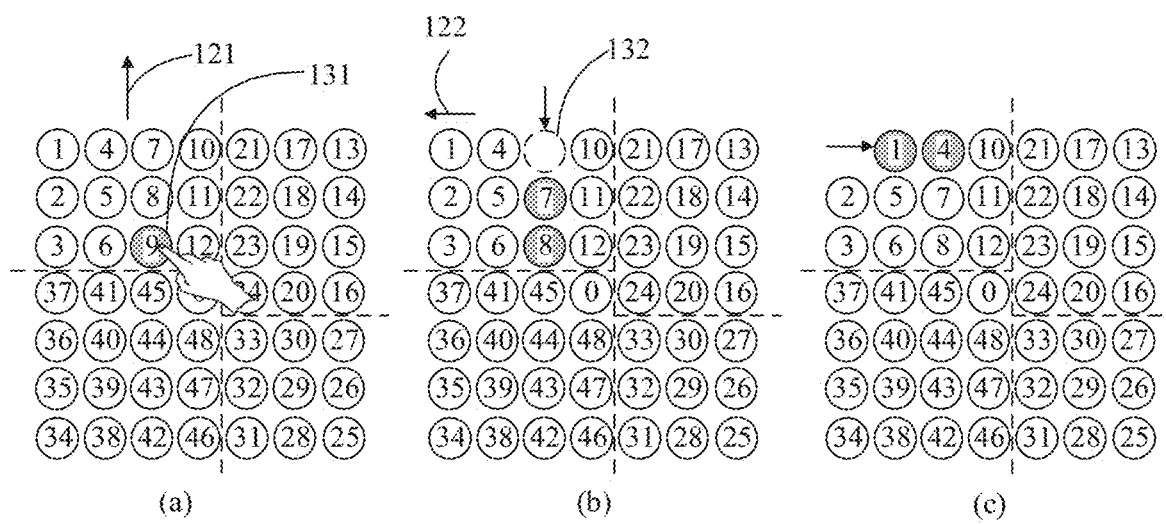
FIG. 17 is a schematic diagram of an icon position change when a user uninstalls an application according to an embodiment of this application.
Figure 18:
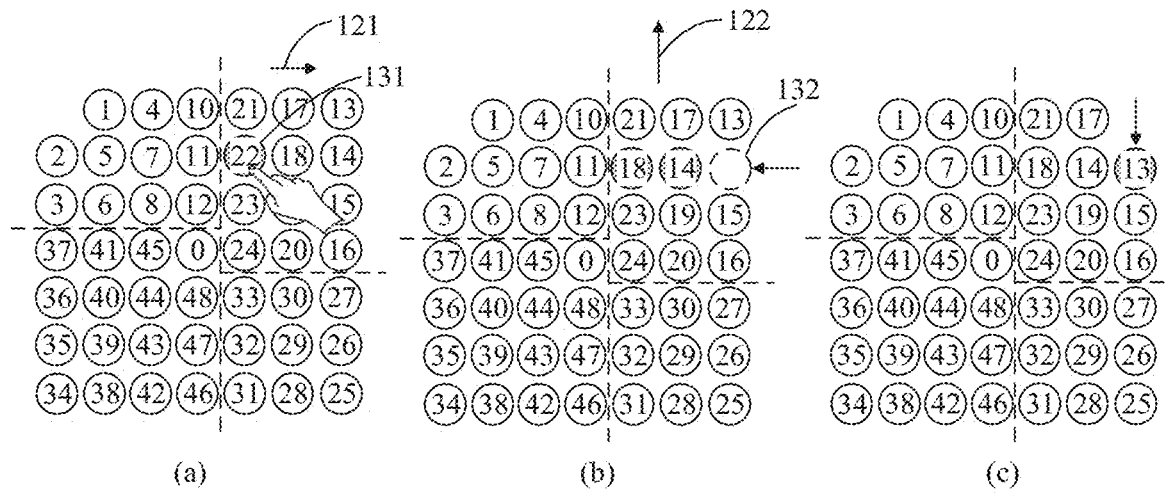
FIG. 18 is a schematic diagram of another icon position change when a user uninstalls an application according to an embodiment of this application.

Exemplary descriptions are provided below with reference to FIG. 17 and FIG. 18. For the ease of description. FIG. 17 and FIG. 18 show a complete second grid without showing a desktop under a local view.

Optionally, in one example, as shown in FIG. 17(a), the user uninstalls an application icon 9 in a desktop under a local view, and a target position is a position 131 of the application icon 9. In a region in which the application icon 9 is located, a first direction 121 is a vertical upward direction, and a second direction 122 is a horizontal leftward direction. It is determined a first application icon adjacent to the application icon 9 exists in the vertical upward direction, which is specifically an application icon 8, and a second application icon is an application icon 7. The application icon 8 and the application icon 7 are sequentially moved vertically downward. The application icon 8 fills the target position 131, and an original position of the application icon 7 is vacant, which is a first position 132, as shown in FIG. 17(b). A third application icon adjacent to the first position 132 exists in the vertical leftward direction, which is specifically an application icon 4, and a fourth application icon is an application icon 1. The application icon 4 and the application icon 1 are sequentially moved horizontally rightward. The application icon 4 fills the first position 132. After the application icon 9 is uninstalled, for a layout of the second grid, refer to FIG. 17(c).

Optionally, in another example, as shown in FIG. 18(a), the user uninstalls an application icon 22 in a desktop under a local view, and a target position is a position 131 of the application icon 22. In a region in which the application icon 22 is located, a first direction 121 is a horizontal rightward direction, and a second direction 122 is a vertical upward direction. It is determined a first application icon adjacent to the application icon 22 exists in the horizontal rightward direction, which is specifically an application icon 18, and a second application icon is an application icon 14. The application icon 18 and the application icon 14 are sequentially moved horizontally leftward. The application icon 18 fills the target position 131, and an original position of the application icon 14 is vacant, which is a first position 132, as shown in FIG. 18(b). A third application icon adjacent to the first position 132 exists in the vertical upward direction, which is specifically an application icon 13. In this case, the third application icon is a fourth application icon. The application icon 13 is moved vertically downward, to fill the first position 132. After the application icon 22 is uninstalled, for a layout of the second grid, refer to FIG. 18(c).

In view of this, in this embodiment, positions of other application icons in the region in which the uninstalled application icon is located can be adjusted. Positions of application icons are slightly adjusted while being visible to the user, to ensure that the application icons after the position adjustment remain in an aggregated and compact visual form, enhances the display effect of application icons, and improves the user experience.

It should be noted that this embodiment and other embodiments of this application can be combined with each other, and a combination manner, a quantity of times of combination, and a combination sequence are not limited. For example, this embodiment can be combined with the embodiments shown in FIG. 6 and FIG. 7. After uninstalling an application under the local view, the user can switch display of the desktop under the local view to display of the desktop under the global view through an operation performed by the user in the embodiments shown in FIG. 6 and FIG. 7, to view a layout of application icons. For example, this embodiment can be combined with the embodiments shown in FIG. 6 and FIG. 7 and the embodiments shown in FIG. 8 and FIG. 9. In another example, this embodiment can be combined with the embodiments shown in FIG. 13 to FIG. 14.

Optionally, in an embodiment of this application, with reference to FIG. 19 to FIG. 22, position changes of application icons when a new application is installed under a local view are described. For the ease of description, FIG. 19 to FIG. 22 show a second grid without showing a desktop under a local view. An application icon at a center position of the desktop under the local view is an application icon 0, and closed circles from inside to outside entered on the application icon 0 in the second grid under the local view are sequentially referred to as a first closed circle, a second closed circle, . . . . A reference sign of an icon of the newly installed application is marked with an underscore.

Optionally, in an implementation, if it is determined that there is no free position for an application icon on each closed circle from inside to outside centered on the application icon 0 in the second grid, that is, a complete square layout, a new closed circle is added, and an icon of the newly installed application is sequentially added according to a preset direction starting from a preset starting position on the new closed circle. Optionally, a preset starting position may be set on each closed circle, and preset starting positions on different closed circles may be the same or different. Optionally, the preset direction can be either a clockwise direction or a counterclockwise direction.

Figure 19:
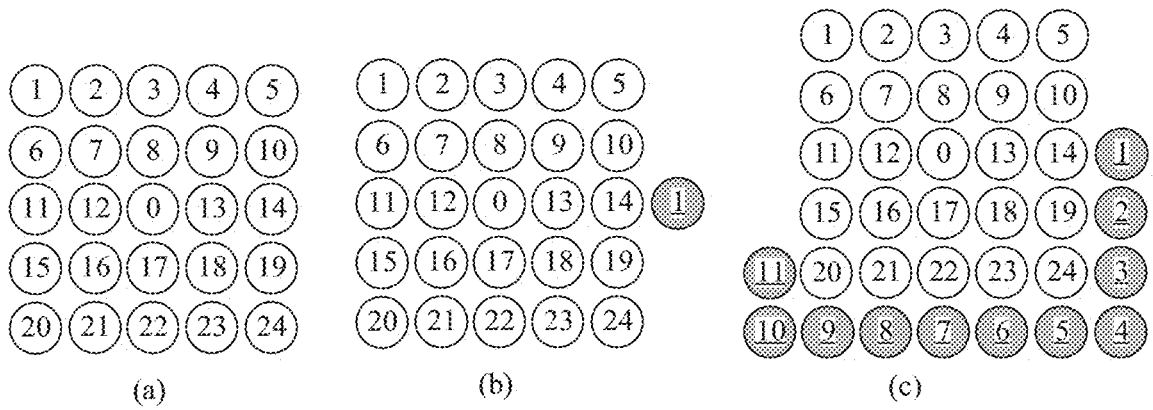
FIG. 19 is a schematic diagram of another icon position change after a new application is installed on a smartwatch according to an embodiment of this application.

For example, refer to FIG. 19. It is assumed that the preset starting position of each closed circle is a three o'clock direction position, and the preset direction is a clockwise direction. As shown in FIG. 19(a), the second grid includes a total of 25 application icons in five rows and five columns, and includes two closed circles from inside to outside centered on the application icon 0. There is no free position for an application icon on each closed circle. The first closed circle located on an inner side includes a total of eight application icons including application icons 7, 8, 9, 13, 18, 17, 16, and 12, and the second closed circle located on an outer side includes a total of 16 application icons including application icons 1, 2, 3, 4, 5, 10, 14, 19, 24, 23, 22, 21, 20, 15, 11, and 6. When a new application is installed, a third closed circle can be added to an outer side of the second closed circle, and an icon of the newly installed application is sequentially added in a clockwise direction starting from the three o'clock direction position on the third closed circle. For example, as shown in FIG. 19(b) and FIG. 19(c), application icons 1 to 11 are sequentially added.

Optionally, in another implementation, if it is determined that a target closed circle exists in closed circles from inside to outside centered on the application icon 0 in the second grid, and there is a free position for an application icon on the target closed circle, that is, an incomplete square layout, the icon of the newly installed application is sequentially added at the free position according to a preset direction starting from a preset starting position on the target closed circle.

For example, refer to FIG. 20. It is assumed that the preset starting position of each closed circle is a three o'clock direction position, and the preset direction is a clockwise direction. As shown in FIG. 20(a), a free position for an application icon exists on the second closed circle located on the outer side in the closed circles from inside to outside centered on the application icon 0 in the second grid in the second grid. The preset starting position on the second closed circle is a position of the application icon 11. An icon of the newly installed application can be sequentially added at a free position in a clockwise direction starting from the position of the application icon 11 on the second closed circle. For example, as shown in FIG. 20(b), FIG. 20(c), and FIG. 20(d), application icons 1 to 6 are sequentially added.

Optionally, in another implementation, if it is determined that a target closed circle exists in closed circles from inside to outside centered on the application icon 0 in the second grid, and there is a free position for an application icon on the target closed circle, that is, an incomplete square layout, the icon of the newly installed application is sequentially added at the free position in an ascending arrangement order according to the distance between the free position and the center of the desktop. If distances between a plurality of free positions and the center of the desktop are equal, an order of adding an icon of a newly installed application at the plurality of free positions is not limited. Optionally, the icon of the newly installed application can be added at a plurality of free positions according to the preset direction starting from the preset starting position on the target closed circle.

For example, refer to FIG. 21. It is assumed that the preset starting position of each closed circle is a three o'clock direction position, and the preset direction is a clockwise direction. As shown in FIG. 21(a), a free position for an application icon exists on the second closed circle located on the outer side in the closed circles from inside to outside centered on the application icon 0 in the second grid in the second grid. In free positions on the second closed circle, a distance between a position 133 and the center of the desktop (application icon 0) is less than a distance between a position 134 and the center of the desktop. The preset starting position on the second closed circle is a position of the application icon 11. An icon of a newly installed application may be first added at the position 133, and then, an icon of a newly installed application may be added at the position 134. When being added at the position 133, the icon of the newly installed application can be sequentially added according to the clockwise direction starting from the position of the application icon 11 on the second closed circle. For example, as shown in FIG. 21(b) and FIG. 21(c), application icons 1 to 2 are sequentially added. When being added at the position 134, the icon of the newly installed application can be added in a clockwise direction after the application icon 2 is added, for example, as shown in FIG. 21(d), application icons 3 to 6 can be sequentially added.

Optionally, if there are a plurality of target closed circles, an icon of a newly installed application may be sequentially added on each target closed circle in a direction from inside to outside centered on the application icon 0. For different target closed circles, the icons of the newly installed applications can be added using the same rule or different rules. For the rule, refer to the foregoing descriptions. Details are not described herein again.

For example, refer to FIG. 22. It is assumed that the preset starting position of each closed circle is a three o'clock direction position, and the preset direction is a clockwise direction. As shown in FIG. 22(a), the first closed circle located on the inner side and the second closed circle located on the outer side in the closed circles from inside to outside centered on the application icon 0 in the second grid are both target closed circles, and a free position for an application icon exists. In a direction from inside to outside and with the application icon 0 as a center, an icon of a newly installed application may be first added on the first closed circle, and then, an icon of a newly installed application may be added on the second closed circle. Specifically, as shown in FIG. 22(b), for the first closed circle, the icon of the newly installed application can be sequentially added at a free position according to the preset direction starting from the preset starting position. Specifically, an application icon 1 is added. Optionally, in an implementation, as shown in FIG. 22(c) and FIG. 22(d), for the second closed circle, icons of newly installed applications are sequentially added at free positions according to a preset direction starting from a preset starting position. Specifically, application icons 2 to 8 are sequentially added. Optionally, in another implementation, as shown in FIG. 22(c) and FIG. 22(e), for the second closed circle, icons of newly installed applications are sequentially added at free positions in an ascending arrangement order according to a distance between the free position and the center of the desktop. Specifically, application icons 2 to 8 are sequentially added.

In view of this, in this embodiment, when adding an icon of a newly installed application, the smartwatch first determines whether an existing closed circle is a complete square layout and whether a free position for an application icon exists. If the existing closed circle is not a complete square layout, the icon of the newly installed application is added at the free position on the existing closed circle. If all the existing closed circles are complete square layouts, a new closed circle is added, the icon of the newly installed application is added at a free position on the new closed circle, to ensure that the application icons remain in an aggregated and compact visual form, which is convenient for a lookup operation performed by a user, enhances the display effect of application icons, and improves the user experience.

It should be noted that this embodiment and other embodiments of this application can be combined with each other, and a combination manner, a quantity of times of combination, and a combination sequence are not limited. For example, this embodiment can be combined with the embodiments shown in FIG. 6 and FIG. 7. After installing a new application under the local view, the user can switch display of the desktop under the local view to display of the desktop under the global view through an operation performed by the user in the embodiments shown in FIG. 6 and FIG. 7, to view a position of the icon of the newly installed application. In another example, this embodiment can be combined with the embodiments shown in FIG. 6, FIG. 7, FIG. 8, and FIG. 9. In another example, this embodiment can be combined with the embodiments shown in FIG. 10 to FIG. 12.

Optionally, in an embodiment of this application, with reference to FIG. 23 to FIG. 30, position changes of application icons when a specific application icon is moved under a local view are described. In this embodiment, a user can move a position of a specific application icon under a local view through a preset operation.

Figure 23:
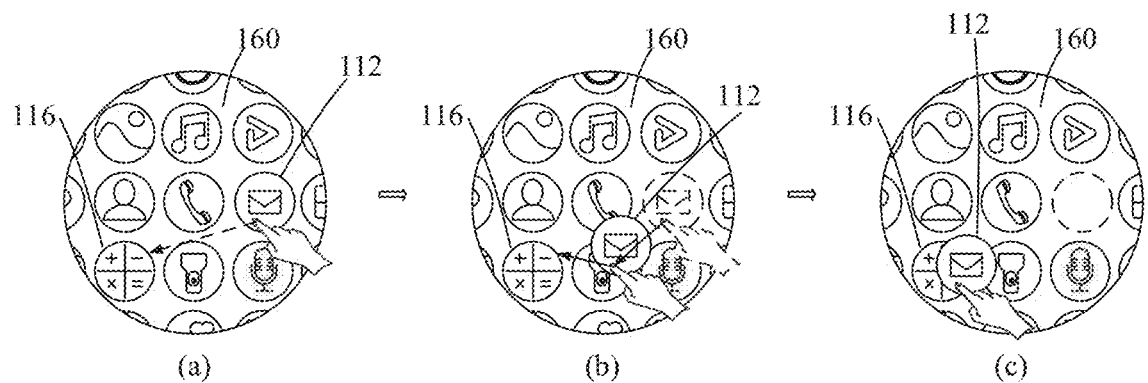
FIG. 23 is a schematic diagram of an interface change of a smartwatch when a user moves an application icon according to an embodiment of this application.

Optionally, in an implementation, a target movement position of the application icon is in a desktop under the local view. For example, FIG. 23 is a schematic diagram of an interface change of a smartwatch when a user moves an application icon according to an embodiment of this application. As shown in FIG. 23(a), the smartwatch currently displays the desktop 164) under the local view. The user wants to adjust an application icon 112 to a position of an application icon 116. As shown in FIG. 23(*b*) and FIG. 23(*c*), the user can drag the application icon 112 to the position of the application icon 116 and make the application icon 112 stay for more than a preset duration, so as to move the application icon. Correspondingly, the smartwatch determines, in response to the operation of dragging the application icon 112 performed by the user, a target movement position, and moves a position of the application icon according to an application icon movement rule.

Figure 24:
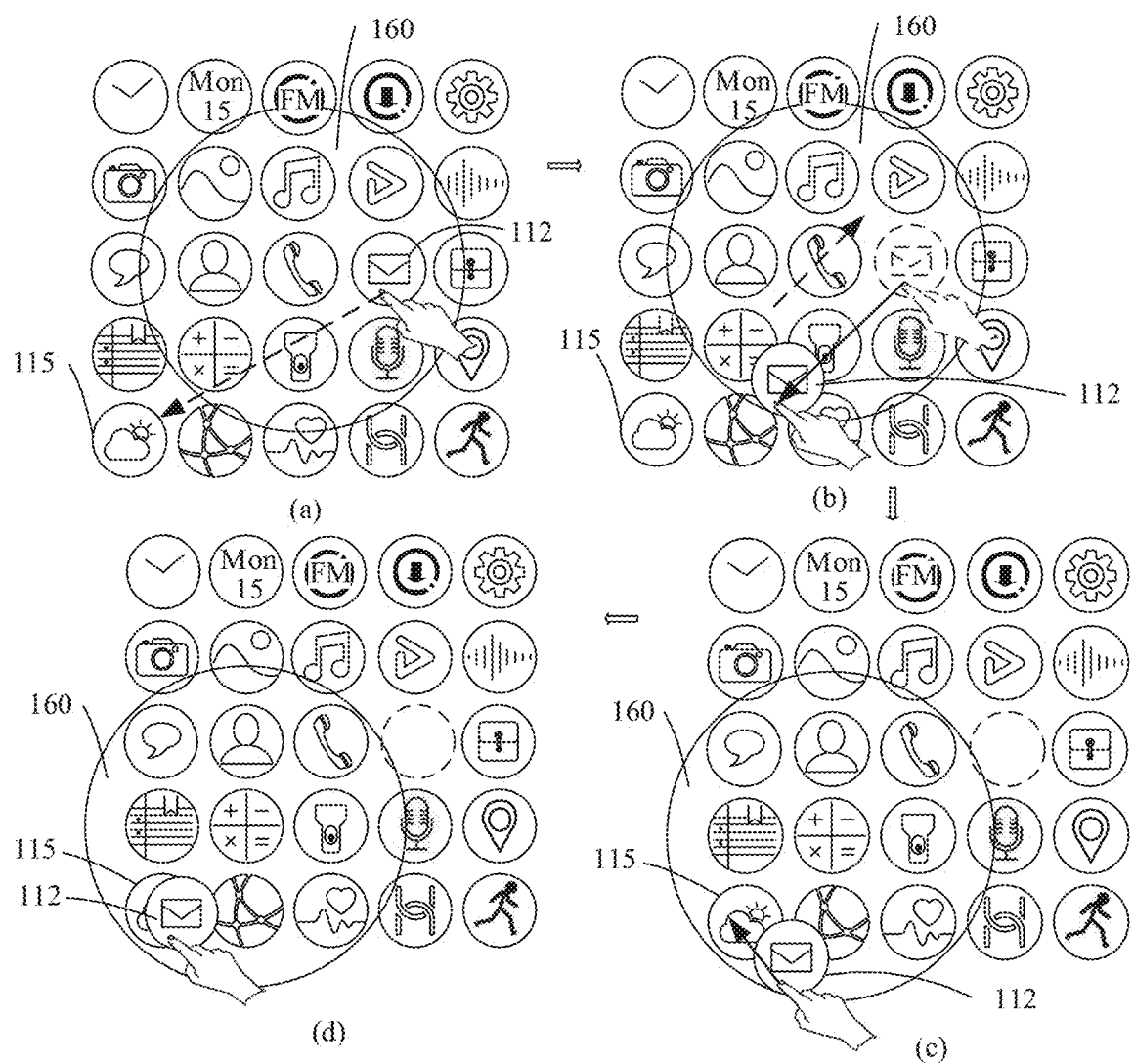
FIG. 24 is a schematic diagram of another interface change of a smartwatch when a user moves an application icon according to an embodiment of this application.

Optionally, in another implementation, a target movement position of the application icon is not in the desktop under the local view. For example, FIG. 24 is a schematic diagram of another interface change of a smartwatch when a user moves an application icon according to an embodiment of this application. As shown in FIG. 24(*a*), the smartwatch currently displays the desktop 160 under the local view. The user wants to adjust an application icon 112 to a position of an application icon 115, but the application icon 115 is currently not in a desktop 160. As shown in FIG. 24(*b*), the user can drag the application icon 112 to a first edge position of the desktop 160, to move the second grid as a whole in the desktop 160 as a whole, thereby displaying application icons in different regions in the second grid in the desktop 160. For example, the second grid can be moved as a whole according to a direction indicated by a dashed line in FIG. 24(*b*). Correspondingly, the smartwatch determines, according to the first edge position, a movement direction of the second grid in response to the operation of dragging the application icon 112 to the first edge position performed by the user, and moves and displays application icons in different regions in the second grid in the desktop 160 under the local view according to the movement direction. As shown in FIG. 24(*b*) and FIG. 24(*c*), when the application icon 115 is displayed in the desktop 160, the user can drag the application icon 112 from the first edge position to the position of the application icon 115 and make the application icon 112 stay for more than a preset duration, so as to move the application icon. Correspondingly, the smartwatch determines, in response to the operation of dragging the application icon 112 performed by the user, a target movement position, and moves a position of the application icon according to an application icon movement rule. Optionally, the first edge position is in contact with a border of the desktop 160. Optionally, as shown in FIG. 24(*b*), the movement direction of the second grid may be opposite to a direction of dragging the application icon 112.

A value of the preset duration is not limited in this embodiment.

Optionally, before the user releases the application icon 112, the smartwatch does not adjust positional relationships between the application icons. For example, as shown in FIG. 23(*b*) and FIG. 23(*c*) or as shown in FIG. 24(*b*) to FIG. 24(*d*), in a process in which the user drags the application icon 112, a position of the application icon 112 is free, and positions of other application icons remain unchanged.

Optionally, if a duration during which the application icon 112 dragged by the user to a specific position stays is less than the preset duration, after the user releases the application icon 112, the application icon 112 returns to an original position, and the desktop 160 under the local view displayed on the smartwatch returns to a state before the application icon 112 is moved.

The preset duration is set to prevent positions of the application icons from being adjusted due to a misoperation performed by the user.

Optionally, the user drags the application icon 112 to a first position and makes the application icon 112 stay for more than a preset duration, if the target movement position of the icon 112 cannot be determined according to the first position, after the user releases the application icon 112, the application icon 112 returns to an original position, and the desktop 160 under the local view displayed on the smartwatch returns to a state before the application icon 112 is moved. For example, the first position is a blank position in the desktop 160 under the local view.

It should be noted that an implementation of determining a target movement position is not limited in this embodiment, and an existing method can be used. For example, distances between a stop position of the application icon 112 and positions of application icon are obtained, and a position of an application icon with a distance less than a preset distance and with the smallest distance as a target movement position.

The application icon movement rule is described below with reference to examples. For the ease of description, a closed circle on which a to-be-moved application icon is located may be referred to as a first closed circle, and a closed circle on which a target movement position is located may be referred to as a second closed circle. The first closed circle and the second closed circle may be the same closed circle or different closed circles.

Figure 25:
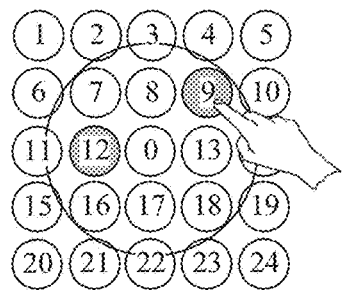
FIG. 25 is a schematic diagram of an icon position change when a user moves an application icon according to an embodiment of this application.
Figure 25:
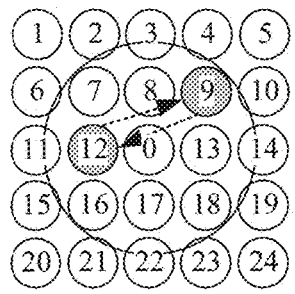
Figure 25:
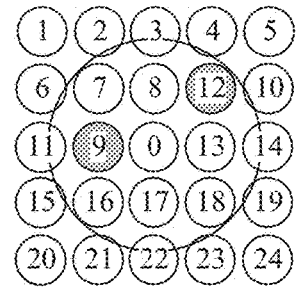

Optionally, in an implementation, the to-be-moved application icon can be swapped with an application icon on the target movement position. For example, FIG. 25 is a schematic diagram of an icon position change when a user moves an application icon according to an embodiment of this application. As shown in FIG. 25(*a*), a to-be-moved application icon is an application icon 9, and a target movement position is a position of an application icon 12, and the target movement position is in the desktop under the local view. As shown in FIG. 25(*b*) and FIG. 25(*c*), the application icon 9 can be directly swapped with the application icon 12.

In this implementation, the to-be-moved application icon and the application icon at the target movement position are directly swapped, which has a simple implementation, avoids adjusting positions of other application icons, is convenient for the user to memorize and look up the application icons, enhances the display effect of application icons, and improves the user experience.

Optionally, in another implementation, if the to-be-moved application icon and the target movement position are on a straight line, all application icons between the to-be-moved application icon and the target movement position (including the to-be-moved application icon and the application icon at the target movement position) are sequentially moved according to a direction of the straight line. The direction of the straight line is not limited in this embodiment, and may be, for example, a horizontal direction, a vertical direction, or a diagonal direction.

In this implementation, all the application icons between the to-be-moved application icon and the application icon at the target movement position are moved, to slightly adjust the positions of the application icons, which avoids adjusting positions of other application icons greatly, is convenient for the user to memorize the application icons, enhances the display effect of application icons, and improves the user experience.

Figure 26:
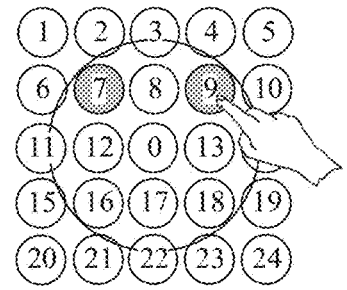
FIG. 26 is a schematic diagram of another icon position change when a user moves an application icon according to an embodiment of this application.
Figure 26:
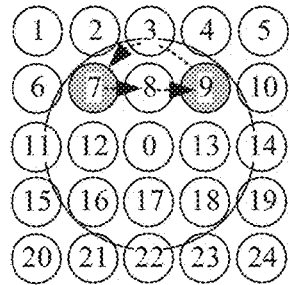
Figure 26:
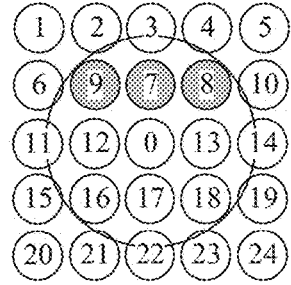

For example, FIG. 26 is a schematic diagram of another icon position change when a user moves an application icon according to an embodiment of this application. In this example, the direction of the straight line is a horizontal direction, and the first closed circle and the second closed circle are the same closed circle. As shown in FIG. 26(a), a to-be-moved application icon is an application icon 9, and a target movement position is a position of an application icon 7, and the target movement position is in the desktop under the local view. As shown in FIG. 26(b) and FIG. 26(c), in a horizontal rightward direction, an application icon 8 can be moved to a position of the application icon 9, the application icon 7 can be moved to a position of the application icon 8, and the application icon 9 can be moved to the position of the application icon 7.

Figure 27:
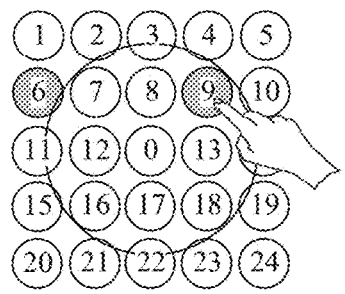
FIG. 27 is a schematic diagram of still another icon position change when a user moves an application icon according to an embodiment of this application.
Figure 27:
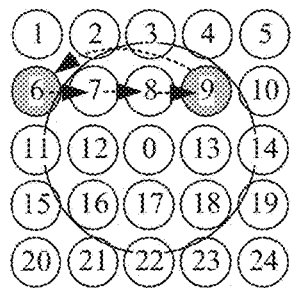
Figure 27:
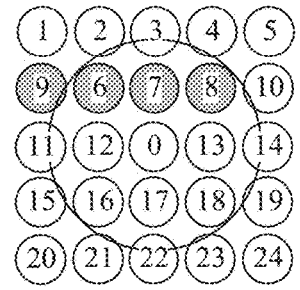

For example, FIG. 27 is a schematic diagram of still another icon position change when a user moves an application icon according to an embodiment of this application. In this example, the direction of the straight line is a horizontal direction, and the first closed circle and the second closed circle are different closed circles. As shown in FIG. 27(a), a to-be-moved application icon is an application icon 9, and a target movement position is a position of an application icon 6, and the target movement position is not in the desktop under the local view. As shown in FIG. 27(b) and FIG. 27(c), in a horizontal rightward direction, an application icon 8 can be moved to a position of the application icon 9, an application icon 7 can be moved to a position of the application icon 8, the application icon 6 can be moved to the position of the application icon 7, and the application icon 9 can be moved to the position of the application icon 6.

Figure 28:
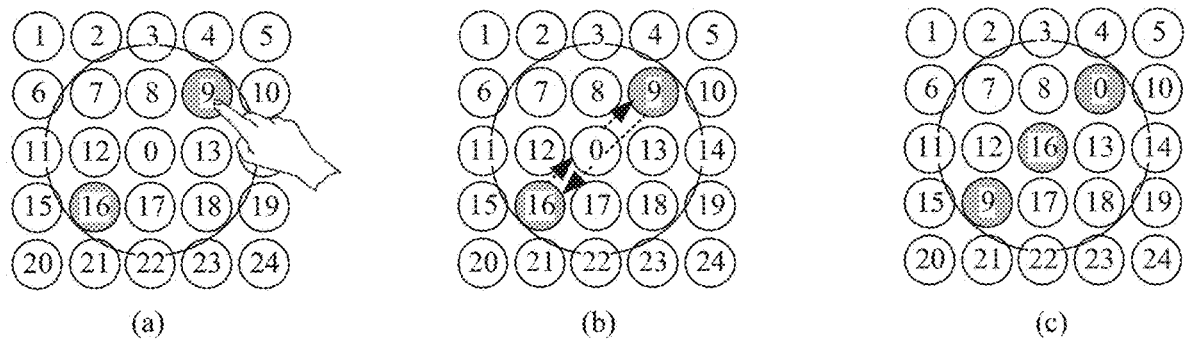
FIG. 28 is a schematic diagram of still another icon position change when a user moves an application icon according to an embodiment of this application.

For example, FIG. 28 is a schematic diagram of still another icon position change when a user moves an application icon according to an embodiment of this application. In this example, the direction of the straight line is a diagonal direction, and the first closed circle and the second closed circle are the same closed circle. As shown in FIG. 28(a), a to-be-moved application icon is an application icon 9, and a target movement position is a position of an application icon 16, and the target movement position is in the desktop under the local view. As shown in FIG. 28(b) and FIG. 28(c), in a diagonal direction, an application icon 0 can be moved to a position of the application icon 9, the application icon 16 can be moved to a position of the application icon 0, and the application icon 9 can be moved to the position of the application icon 16.

Optionally, in still another implementation, if the to-be-moved application icon and the target movement position are not on a straight line, an indeterminate application icon is determined. The indeterminate application icon is an application icon at an intersection between a first straight line on which the to-be-moved application icon is located and a second straight line on which the target movement position is located. The first straight line is perpendicular to the second straight line. Application icons on a broken line formed by the to-be-moved application icon, the intermediate application icon, and the target movement position are sequentially moved. Optionally, a direction of the first straight line is a horizontal direction, and a direction of the second straight line is a vertical direction, or the direction of the first straight line is a vertical direction, and the direction of the second straight line is a horizontal direction.

In this implementation, all application icons on a right triangle with the to-be-moved application icon and the target movement position as hypotenuse vertices are moved, to slightly adjust the positions of the application icons, which avoids adjusting positions of other application icons greatly, is convenient for the user to memorize the application icons, enhances the display effect of application icons, and improves the user experience.

Figure 29:
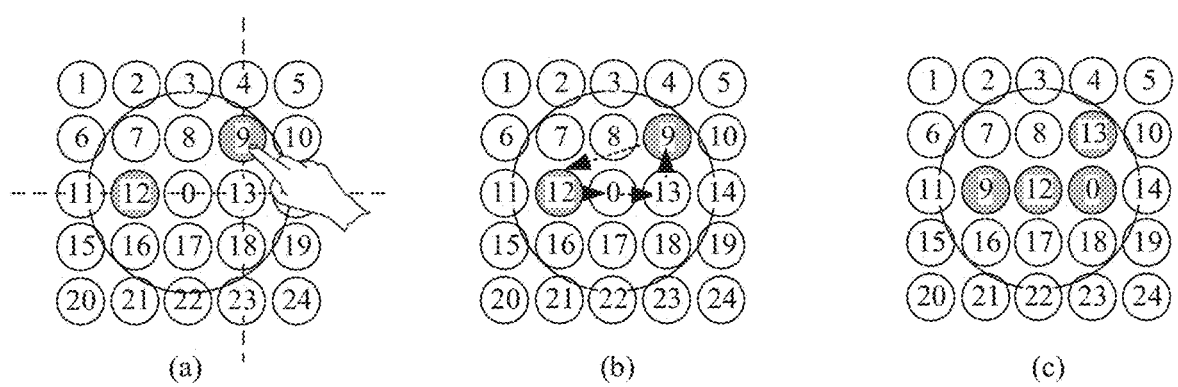
FIG. 29 is a schematic diagram of still another icon position change when a user moves an application icon according to an embodiment of this application.

For example, FIG. 29 is a schematic diagram of still another icon position change when a user moves an application icon according to an embodiment of this application. In this example, the direction of the first straight line is a vertical direction, the direction of the second straight line is a horizontal direction, and the first closed circle and the second closed circle are the same closed circle. As shown in FIG. 29(a), a to-be-moved application icon is an application icon 9, and a target movement position is a position of an application icon 12, and the target movement position is in the desktop under the local view. An application icon at an intersection between the first straight line in a vertical direction on which the application icon 9 is located and the second straight line in a horizontal direction on which the application icon 12 is located is an application icon 13, and the application icon 13 is an intermediate application icon. Application icons on the broken line formed by the application icon 9, the application icon 13, and the application icon 12 include: application icons 9, 13, 0, and 12, and then positions of the application icons can be moved sequentially. Specifically, as shown in FIG. 29(b) and FIG. 29(c), the application icon 13 can be moved to a position of the application icon 9, the application icon 0 can be moved to a position of the application icon 13, the application icon 12 can be moved to a position of the application icon 0, and the application icon 9 can be moved to a position of the application icon 12.

Figure 30:
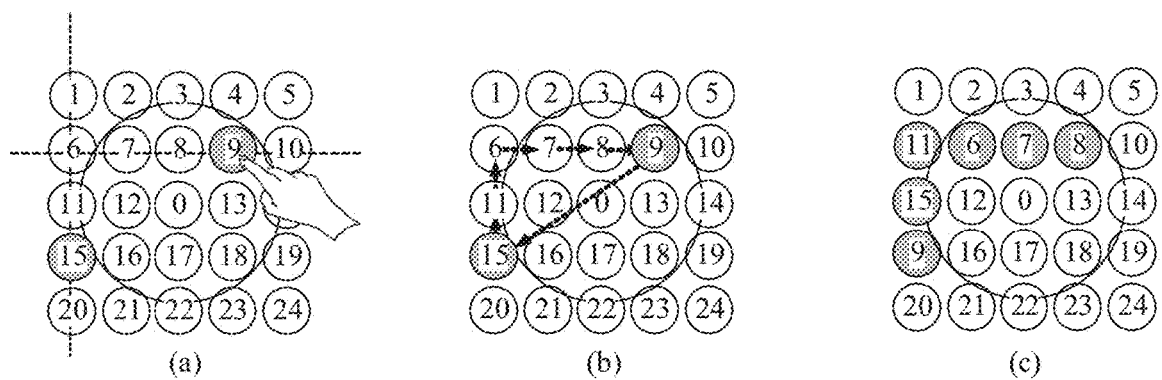
FIG. 30 is a schematic diagram of still another icon position change when a user moves an application icon according to an embodiment of this application.

For example, FIG. 30 is a schematic diagram of still another icon position change when a user moves an application icon according to an embodiment of this application. In this example, the direction of the first straight line is a horizontal direction, the direction of the second straight line is a vertical direction, and the first closed circle and the second closed circle are different closed circles. As shown in FIG. 30(a), a to-be-moved application icon is an application icon 9, and a target movement position is a position of an application icon 15, and the target movement position is not in the desktop under the local view. An application icon at an intersection between the first straight line in a horizontal direction on which the application icon 9 is located and the second straight line in a vertical direction on which the application icon 15 is located is an application icon 6, and the application icon 6 is an intermediate application icon. Application icons on the broken line formed by the application icon 9, the application icon 6, and the application icon 15 include: application icons 9, 8, 7, 6, 11, and 15, and then positions of the application icons can be moved sequentially. Specifically, as shown in FIG. 30(b) and FIG. 30(c), the application icon 8 can be moved to a position of the application icon 9, the application icon 7 can be moved to a position of the application icon 8, the application icon 6 can be moved to a position of the application icon 7, the application icon 11 can be moved to a position of the application icon 6, the application icon 15 can be moved to a position of the application icon 11, and the application icon 9 can be moved to a position of the application icon 15.

It should be noted that this embodiment and other embodiments of this application can be combined with each other, and a combination manner, a quantity of times of combination, and a combination sequence are not limited. For example, this embodiment can be combined with the embodiments shown in FIG. 19 to FIG. 22, so that a position of a specific application icon can be moved and a new application icon can be added under a local view. In another example, this embodiment can be combined with the embodiments shown in FIG. 6 and FIG. 7. After moving a position of a specific application icon under the local view, the user can switch display of the desktop under the local view to display of the desktop under the global view through an operation performed by the user in the embodiments shown in FIG. 6 and FIG. 7, to view a layout of application icons. For example, this embodiment can be combined with the embodiments shown in FIG. 6, FIG. 7, FIG. 8, and FIG. 9 and the embodiments shown in FIG. 9 and FIG. 10. In another example, this embodiment can be combined with the embodiments shown in FIG. 15 to FIG. 18.

It may be understood that to implement the foregoing functions, the terminal device includes corresponding hardware and/or software modules for performing the functions. Algorithm steps in the examples described with reference to the embodiments disclosed in this specification can be implemented by hardware or a combination of hardware and computer software in this application. Whether a function is implemented by hardware or computer software driving hardware depends on particular applications and design constraints of the technical solutions. A person skilled in the art may use different methods to implement the described functions for each particular application with reference to the embodiments, but this implementation shall not be considered as going beyond the scope of this application.

In the embodiments of this application, functional modules of the terminal device may be divided based on the foregoing method example. For example, each functional module may be divided according to each function, or two or more functions may be integrated into one processing module. It should be noted that in this embodiment of this application, the module division is an example, and is merely logical function division, and there may be other division manners during actual application. It should be noted that in the embodiments of this application, names of modules are illustrative, and during actual implementation, the names of the modules are not limited.

Figure 31:
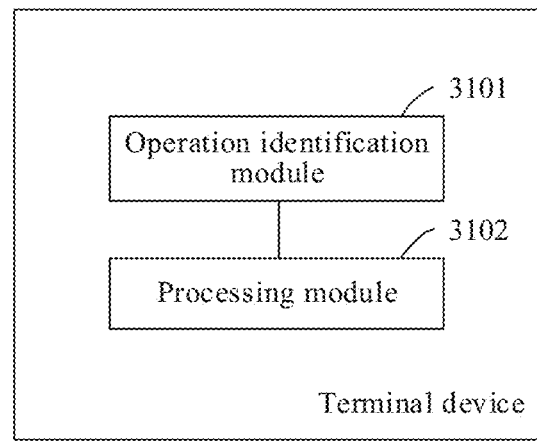
FIG. 31 is a schematic structural diagram of a terminal device according to an embodiment of this application.

In a case that the functional modules are divided correspondingly to the functions, FIG. 31 is a schematic structural diagram of a terminal device according to an embodiment of this application. As shown in FIG. 31, the terminal device may include an operation identification module 3101 and a processing module 3102.

The operation identification module 3101 is configured to receive an operation performed by a user, and identify the operation. The operation performed by the user includes, but is not limited to, at least one of the following: a click operation, for example, clicking an application icon on a desktop or clicking a switch control on an interface of an application; a swipe operation performed on the desktop, for example, a straight-line swipe operation or a broken-line swipe operation; dragging and moving an icon on the desktop; a two-finger pinching operation performed on the desktop; pressing a crown; or rotating the crown.

The processing module 3102 is configured to perform processing steps in the foregoing method embodiments of this application in response to the operation performed by the user, for example, after a smartwatch is awoken from a standby state, displaying a main interface or a desktop under a local view, switching display of a desktop under a global view to display of the desktop under the local view, switching display of the desktop under the local view to the desktop under the global view, installing a new application, uninstalling an application, moving an application icon in the desktop, switching between display of different desktops under the local view, or moving an application icon under the local view.

It should be noted that all related content of the steps in the foregoing method embodiment may be quoted to functional descriptions of corresponding functional modules, and details are not described herein again.

Figure 32:
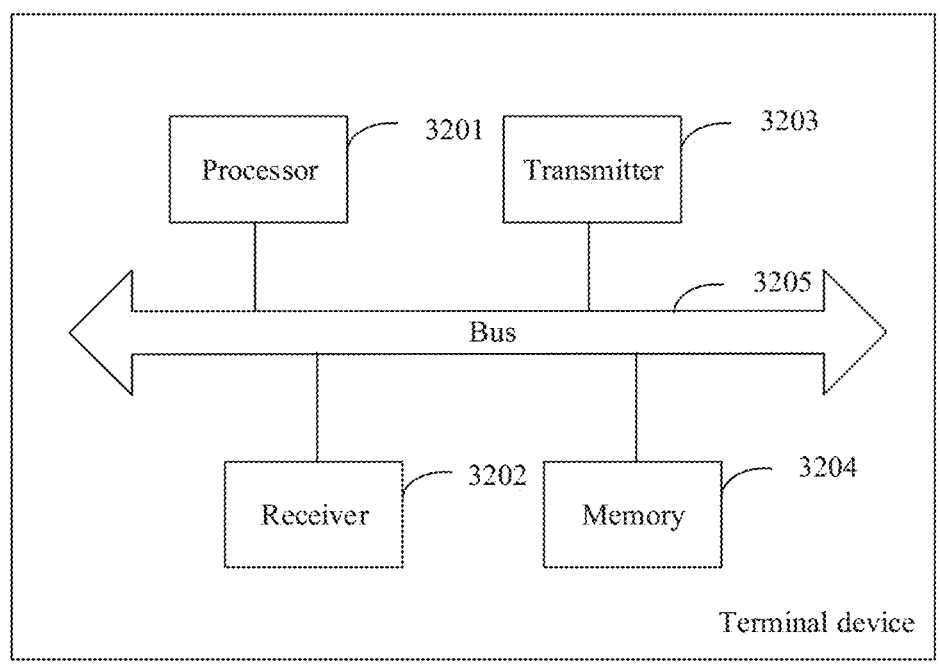
FIG. 32 is another schematic structural diagram of a terminal device according to an embodiment of this application.

Referring to FIG. 32, which shows another structure of a terminal device according to an embodiment of this application. The terminal device includes: a processor 3201, a receiver 3202, a transmitter 3203, a memory 3204, and a bus 3205. The processor 3201 includes one or more processing cores, and the processor 3201 performs various functional applications and information processing by running a software program and module. The receiver 3202 and the transmitter 3203 can be implemented as one communication component. The communication component may be a baseband chip. The memory 3204 is connected to the processor 3201 by the bus 3205. The memory 3204 can be configured to store at least one program instruction, and the processor 3201 is configured to execute at least one program instruction, to implement the technical solutions of the foregoing embodiments. Their implementation principles and technical effects are similar those in the method-related embodiments, and details are not described herein again.

When the terminal is powered on, the processor can read a software program in the memory, interpret and execute instructions of the software program, and process data of the software program. When needing to send data through an antenna, after performing baseband processing on to-be-sent data, the processor outputs a baseband signal to a control circuit in a control circuit; and the control circuit performs radio frequency processing on the baseband signal and then sends the radio frequency signal to the outside in a form of an electromagnetic wave by using the antenna. When data is sent to the terminal, the control circuit receives the radio frequency signal by using the antenna, converts the radio frequency signal into a baseband signal, and outputs the baseband signal to the processor. The processor converts the baseband signal into data, and processes the data.

A person skilled in the art may understand that for the ease of description, FIG. 32 shows only one memory and processor. In an actual terminal, there may be a plurality of processors and memories. The memory may also be referred to as a storage medium, a storage device, or the like, which is not limited in the embodiments of this application.

In an optional implementation, the processor may include a baseband processor and a central processing unit. The baseband processor is mainly configured to process communication data. The central processing unit is mainly configured to execute a software program and process data of the software program. A person skilled in the art may understand that the baseband processor and the central processing unit may be integrated in one processor, or may be independent processors interconnected by technologies such as a bus. A person skilled in the art may understand that the terminal may include a plurality of baseband processors to adapt to different network standards. The terminal may include a plurality of central processing units, to enhance its processing capability. Various components of the terminal can be connected by various buses. The baseband processor may also be expressed as a baseband processing circuit or a baseband processing chip. The central processing unit may also be expressed as a central processing circuit or a central processing chip. The function of processing the communication protocol and communication data can be built in the processor or stored in the memory in the form of a software program. The processor executes the software program to implement the baseband processing function. The memory may be integrated in the processor or independent of the processor. The memory includes a cache Cache, and can store frequently accessed data/instructions.

In the embodiments of this application, the processor may be a general processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. Steps of the methods disclosed with reference to the embodiments of this application may be directly performed and completed by a hardware processor, or may be performed and completed by using a combination of hardware and a software module in the processor.

In the embodiments of this application, the memory may be a nonvolatile memory such as a hard disk drive (hard disk drive, HDD) or a solid-state drive (solid-state drive, SS), or may be a volatile memory (volatile memory), for example, a random-access memory (random-access memory. RAM). The memory is any other medium that can carry or store expected program code in a form of an instruction or a data structure and can be accessed by a computer, but is not limited thereto.

The memory according to this embodiment of this application may be further a circuit or any other apparatus that can implement a storage function, and is configured to store program instructions and/or data. The methods provided in the foregoing embodiments of this application may be fully or partially implemented by software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the processes or functions according to the embodiments of this application are produced. The computer may be a general-purpose computer, a dedicated computer, a computer network, a network device, user equipment, or other programmable apparatuses. The computer instructions may be stored in a computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (such as a floppy disk, a hard disk drive, or a magnetic tape), an optical medium (such as a digital video disc (digital video disc, DVD)), a semiconductor medium (such as an SSD)), or the like.

The embodiments of this application provide a computer program product, causing, when run on a terminal, the terminal to perform the technical solutions in the foregoing embodiments. Their implementation principles and technical effects are similar those in the related embodiments, and details are not described herein again.

The embodiments of this application provide a computer-readable storage medium, storing program instructions, where the program instructions, when executed by a terminal, causing the terminal to perform the technical solutions in the foregoing embodiments. Their implementation principles and technical effects are similar those in the related embodiments, and details are not described herein again. In conclusion, the foregoing embodiments are merely intended for describing the technical solutions of this application, but not for limiting this application. It should be understood by a person of ordinary skill in the art that although this application has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the scope of the technical solutions of the embodiments of this application.

What is claimed is:

1. A method, comprising:
adding, if a free position exists in a plurality of rectangular circles in an icon grid, a target application icon corresponding to a target application at the free position, wherein the icon grid is formed by arranging all current application icons of a terminal device in a grid manner, and wherein the rectangular circles are centered on a center of the icon grid;
displaying a first desktop that comprises part of the application icons of the icon grid;
receiving a first desktop switching operation from a user;
switching from displaying the first desktop to displaying a second desktop in response to the first desktop switching operation, wherein the second desktop comprises all the application icons in the icon grid;
receiving a second desktop switching operation performed by the user; and
switching from displaying the second desktop to displaying the first desktop in response to the second desktop switching operation.

2. The method of claim 1, wherein the free position is a first free position starting from a preset starting position of an outer side rectangular circle in a preset direction.

3. The method of claim 1, wherein adding the target application icon corresponding to the target application at the free position comprises:
obtaining a distance between the free position and the center of the icon grid; and
adding the target application icon at a second free position, wherein a distance between the second free position and the center of the icon grid is a minimum of distances corresponding to all free positions.

4. The method of claim 1, further comprising adding a new rectangular circle in the icon grid if the free position does not exist, and adding the target application icon at a preset starting position of the new rectangular circle.

5. The method of claim 1, further comprising:
displaying the first desktop;
receiving an application icon position adjustment operation from a user; and
moving the first application icon to the position of a second application icon in response to the application icon position adjustment operation.

6. The method of claim 5, wherein moving the first application icon to the position of the second application icon comprises swapping the first application icon and the second application icon.

7. The method of claim 5, wherein moving the first application icon to the position of the second application icon comprises:
circularly moving, if the first application icon and the second application icon are located on a same straight line, application icons on the straight line and between the first application icon and the second application icon in sequence; and circularly moving, if the first application icon and the second application icon are not located on a same straight line, application icons on a right triangle with the first application icon and the second application icon as hypotenuse vertices.

8. The method of claim 1, wherein a center of the second desktop is the center of the icon grid.

9. The method of claim 8, wherein the terminal device is a smartwatch, the first desktop switching operation is a crown rotating operation or a two-finger pinching operation, and the second desktop switching operation is a crown rotating operation or a two-finger pinching operation.

10. The method of claim 1, further comprising:
displaying the first desktop;
receiving a swipe operation from a user, wherein the swipe operation is configured to display application icons in different regions in the icon grid in the first desktop;
obtaining a starting position and a swiping trajectory of the swipe operation in response to the swipe operation; and
controlling the icon grid to move as a whole with a first reference point as a center and according to the swiping trajectory, and to display the application icons in the different regions in the icon grid in the first desktop, wherein the first reference point corresponds to the starting position in the icon grid.

11. The method of claim 10, further comprising:
obtaining an end position of the swipe operation in response to the swipe operation; and
displaying to-be-displayed application icons in the first desktop, wherein the to-be-displayed application icons are based on a reference application icon, wherein the reference application icon is based on a center of the first desktop and position information of the application icons in the icon grid after moving the first reference point to the end position, and wherein the reference application icon is an application icon displayed at the center of the first desktop after the swipe operation ends.

12. The method of claim 1, further comprising:
deleting, when the target application is uninstalled from the terminal device, the target application icon corresponding to the target application from the icon grid; and
moving first to-be-moved application icons according to an opposite direction of a first direction if the first to-be-moved application icons exist in the first direction, wherein the first direction is a horizontal direction or a vertical direction away from the center of the icon grid with the target application icon as a starting point.

13. The method of claim 12, further comprising moving second to-be-moved application icons according to an opposite direction of a second direction if the second to-be-moved application icons exist in the second direction, wherein the second direction is a horizontal direction or a vertical direction away from the center of the icon grid with a target position as a starting point, the second direction is perpendicular to the first direction, and the target position is a position at which the last first to-be-moved application icon in the first direction is located before the last first to-be-moved application icon is moved in the opposite direction of the first direction.

14. The method of claim 12, wherein if no first to-be-moved application icon exists in the first direction, the method further comprises moving third to-be-moved application icons according to an opposite direction of a third direction if the third to-be-moved application icons exist in the third direction, wherein the third direction is a horizontal direction or a vertical direction away from the center of the icon grid with the target application icon as a starting point, and the third direction is perpendicular to the first direction.

15. A terminal device, comprising:
a display screen;
one or more processors coupled to the display screen;
a memory coupled to the one or more processors, wherein the memory contains instructions that, when executed by the one or more processors, cause the terminal device to be configured to:
add, if a free position exists in a plurality of rectangular circles in an icon grid, a target application icon corresponding to a target application at the free position, wherein the icon grid is formed by arranging all current application icons of a terminal device in a grid manner, and wherein the rectangular circles are centered on a center of the icon grid;
display a first desktop that comprises part of the application icons of the icon grid;
receive a first desktop switching operation from a user;
switch from displaying the first desktop to displaying a second desktop in response to the first desktop switching operation, wherein the second desktop comprises all the application icons in the icon grid;
receive a second desktop switching operation performed by the user; and
switch from displaying the second desktop to displaying the first desktop in response to the second desktop switching operation.

16. A non-transitory computer-readable storage medium, storing computer instructions that, when executed by a processor of a terminal device, cause the terminal device to be configured to:
add, if a free position exists in a plurality of rectangular circles in an icon grid, a target application icon corresponding to a target application at the free position, wherein the icon grid is formed by arranging all current application icons of a terminal device in a grid manner, and wherein the rectangular circles are centered on a center of the icon grid;
display a first desktop that comprises part of the application icons of the icon grid;
receive a first desktop switching operation from a user;
switch from displaying the first desktop to displaying a second desktop in response to the first desktop switching operation, wherein the second desktop comprises all the application icons in the icon grid;
receive a second desktop switching operation performed by the user; and
switch from displaying the second desktop to displaying the first desktop in response to the second desktop switching operation.

17. The terminal device of claim 15, wherein the free position is a first free position starting from a preset starting position of an outer side rectangular circle in a preset direction.

18. The terminal device of claim 15, wherein when the terminal device adds the target application icon corresponding to the target application at the free position, the terminal device is further configured to:

obtain a distance between the free position and the center of the icon grid; and add the target application icon at a second free position, wherein a distance between the second free position and the center of the icon grid is a minimum of distances corresponding to all free positions.

19. The terminal device of claim 15, wherein the instructions, when executed by the processor, further cause the terminal device to be configured to add a new rectangular circle in the icon grid if the free position does not exist, and add the target application icon at a preset starting position of the new rectangular circle.

20. The terminal device of claim 15, wherein the instructions, when executed by the processor, further cause the terminal device to be configured to:

display the first desktop;

receive an application icon position adjustment operation from a user; and move the first application icon to the position of a second application icon in response to the application icon position adjustment operation.

* * * * *